US010114812B1

(12) United States Patent
Ghaddar

(10) Patent No.: US 10,114,812 B1
(45) Date of Patent: Oct. 30, 2018

(54) METHOD, APPARATUS, AND COMPUTER PROGRAM PRODUCT FOR SOLVING AN EQUATION SYSTEM USING PURE SPREADSHEET FUNCTIONS

(71) Applicant: Chahid Kamel Ghaddar, Sharon, MA (US)

(72) Inventor: Chahid Kamel Ghaddar, Sharon, MA (US)

( * ) Notice: Subject to any disclaimer, the term of this patent is extended or adjusted under 35 U.S.C. 154(b) by 0 days.

(21) Appl. No.: 15/861,897

(22) Filed: Jan. 4, 2018

Related U.S. Application Data

(63) Continuation of application No. 15/003,848, filed on Jan. 22, 2016, now Pat. No. 9,892,108, which is a continuation of application No. 14/588,909, filed on Jan. 3, 2015, now Pat. No. 9,286,286.

(51) Int. Cl.
*G06F 17/24* (2006.01)
*G06F 17/11* (2006.01)
(52) U.S. Cl.
CPC ............ *G06F 17/246* (2013.01); *G06F 17/11* (2013.01)
(58) Field of Classification Search
CPC ......... G06F 17/11; G06F 17/24; G06F 17/246
See application file for complete search history.

(56) References Cited

U.S. PATENT DOCUMENTS

| | | | | |
|---|---|---|---|---|
| 5,787,453 A * | 7/1998 | Kennedy | ................... | G06F 8/00 707/999.004 |
| 5,983,268 A * | 11/1999 | Freivald | ............ | G06F 17/30899 707/E17.116 |
| 6,988,241 B1 * | 1/2006 | Guttman | ................ | G06F 17/246 707/E17.115 |
| 7,010,779 B2 * | 3/2006 | Rubin | ....................... | G06F 8/30 715/212 |
| 7,444,584 B1 * | 10/2008 | Hobbs | ................... | G06F 17/246 715/212 |
| 8,161,372 B2 * | 4/2012 | Ellis | ...................... | G06F 17/246 715/212 |

(Continued)

OTHER PUBLICATIONS

Eric Naevdal, Spring 2003, Solving Continuous-Time Optimal-Control Problems with a Spreadsheet, Journal of Economic Education , 99-122 (solving continuous.pdf) (Year: 2003).*

(Continued)

*Primary Examiner* — Scott T Baderman
*Assistant Examiner* — Sookil J Lee

(57) ABSTRACT

The present disclosure provides a method, an apparatus, and a computer program product to interact with a programming interface of a spreadsheet software application for computing the value of a formula that depends explicitly or implicitly on one or more cells designated as variables for the formula, based on supplied values for the variables, and without modifying any values or content of the spreadsheet software application. In a first utility, the method is utilized in pure solver functions of the spreadsheet application for computing numerical solution of an equation system modeled by at least one or more formulas and variables in the spreadsheet software application. In a second utility, the method is utilized in an optimization process executed by pure solver functions of the spreadsheet application for computing optimal parameters for a parameterized equation system modeled by at least one or more formulas, variables, and parameters.

22 Claims, 16 Drawing Sheets

(56) References Cited

U.S. PATENT DOCUMENTS

| | | | | |
|---|---|---|---|---|
| 8,370,243 | B1* | 2/2013 | Cernyar | G06Q 40/06 |
| | | | | 705/35 |
| 8,494,988 | B2* | 7/2013 | Ferringer | G06N 3/086 |
| | | | | 706/13 |
| 2001/0056440 | A1* | 12/2001 | Abramson | G06F 17/246 |
| | | | | 715/219 |
| 2003/0088540 | A1* | 5/2003 | Edmunds | G06F 17/246 |
| 2003/0226105 | A1* | 12/2003 | Waldau | G06F 17/30905 |
| | | | | 715/212 |
| 2005/0060342 | A1* | 3/2005 | Farag | G06F 17/3056 |
| 2006/0085386 | A1* | 4/2006 | Thanu | G06F 17/246 |
| 2006/0111881 | A1* | 5/2006 | Jackson | G06F 17/11 |
| | | | | 703/2 |
| 2007/0033519 | A1* | 2/2007 | Zdenek | G06F 17/215 |
| | | | | 715/234 |
| 2007/0250295 | A1* | 10/2007 | Murray | G06Q 10/10 |
| | | | | 703/2 |
| 2008/0028288 | A1* | 1/2008 | Vayssiere | G06F 17/246 |
| | | | | 715/219 |
| 2009/0030736 | A1* | 1/2009 | Tatro | G06Q 40/00 |
| | | | | 705/4 |
| 2009/0077543 | A1* | 3/2009 | Siskind | G06F 8/447 |
| | | | | 717/136 |
| 2009/0113283 | A1* | 4/2009 | Sol | G06F 17/246 |
| | | | | 715/212 |
| 2009/0119309 | A1* | 5/2009 | Gibson | G06F 17/30572 |
| 2010/0156900 | A1* | 6/2010 | Beckman | G06T 19/00 |
| | | | | 345/420 |
| 2011/0060704 | A1* | 3/2011 | Rubin | G06N 99/005 |
| | | | | 706/12 |
| 2011/0078635 | A1* | 3/2011 | Fried | G06F 17/2235 |
| | | | | 715/854 |
| 2011/0137830 | A1* | 6/2011 | Ozyurt | G06N 7/06 |
| | | | | 706/12 |
| 2012/0042242 | A1* | 2/2012 | Garland | G06F 17/215 |
| | | | | 715/256 |
| 2012/0137203 | A1* | 5/2012 | Schodl | G06F 17/246 |
| | | | | 715/215 |
| 2013/0024342 | A1* | 1/2013 | Horowitz | G06Q 40/00 |
| | | | | 705/35 |
| 2013/0036346 | A1* | 2/2013 | Cicerone | G06F 17/246 |
| | | | | 715/217 |
| 2013/0159832 | A1* | 6/2013 | Ingargiola | G06F 17/246 |
| | | | | 715/220 |
| 2014/0040855 | A1* | 2/2014 | Wang | G06F 8/34 |
| | | | | 717/107 |

OTHER PUBLICATIONS

Texas Instruments, 2010, https://education.ti.conn/download/en/US/FA1DC891957E4700B46A67255850C592/983EA8A4BA2A4AE9B2AF5EEEE922E3C 1/TI-89_Guidebook_EN.pdf (TI-89 manual.pdf), pp. (5,11,23,38,40,59-62) (Year: 2010).*

Texas Instruments, Feb. 7 2002, https://education.ti.com/download/en/US/C348D29C99284143B9E3FE93CF6742A6/926570B5F7CC484AA801F0D8B207B707/89942cell)eng.pdf (Cellsheet.pdf), pp. (22,77,82,443,452,453,802,816,902,903) (Year: 2002).*

Palisade Corporation, Jan. 2013, Evolver the Genertic Algorithm Solver for Microsoft Excel (Evolver6_EN.pdf), Version 6, pp. 1-166 (Year: 2013).*

* cited by examiner

Expr = (((A+((B*C)*D))-((E-(F*G))^(H-I)))+(((J*K)/L)-M))

METHOD, APPARATUS, AND COMPUTER PROGRAM PRODUCT FOR SOLVING AN EQUATION SYSTEM USING PURE SPREADSHEET FUNCTIONS

CROSS-REFERENCE TO RELATED APPLICATIONS

This application is a continuation of application Ser. No. 15/003,848 filed Jan. 22, 2016, which is a continuation of application Ser. No. 14/588,909, filed Jan. 3, 2015, the context of which are expressly incorporated.

BACKGROUND

Technical Field

This present disclosure relates to a method, an apparatus, and a computer program product for solving equation system models using spreadsheet software. More particularly, the present disclosure relates to computer methods and apparatuses for computing numerical solutions for calculus problems in a spreadsheet application including problems of integration, differentiation, nonlinear systems, differential equations and optimization.

Description of Related Art

Spreadsheet applications (such as Excel® of Microsoft Corp., hereafter "Excel") are used universally for business as well as engineering and scientific data modeling and analysis. The widespread adoption of the spreadsheet application is supported in part by its inherent simplicity of defining formulas and manipulating data, in addition to a practical set of built-in functions, charting tools, and extensibility. Numerous extensions (aka Add-Ins) have been developed to extend Excel utility into various applications, including solutions to differential equations and optimization of algebraic and stochastic models. However, computational problems in constrained optimization involving systems of differential and differential-algebraic equations are beyond the limitations of existing Add-Ins. Such problems arise frequently in engineering and scientific applications when it is required to compute optimal values for a parameterized system of differential equations to satisfy objective constraints on the system response. Prior art Add-Ins do not offer an integrated solution to this class of problems in Excel spreadsheet application.

On the other hand, constrained optimization involving algebraic objective function and constraints has long been supported in Excel. In fact, Excel ships with a standard built in solver that is inherently limited to algebraic formulas that can be defined in Excel worksheets. Excel solver is an instance of an Excel command that is executed via an interactive dialogue, and performs operations in response to user actions as follows:

1. The user selects worksheet cells to hold initial values for each decision variable in a model.
2. The user creates a formula in another worksheet cell that calculates the objective function for the model.
3. The user creates additional formulas in worksheet cells to calculate the left hand sides of each constraint.
4. Via the command interface dialogue, the user selects the decision variables cells, the objective cell, the constraints cells, and enters desired bounds for each constraint and variable.
5. The solver iterates, altering the decision variables cells' values and recalculating the dependent objective and constraints cells values until such values are found which minimize the objective function value and satisfy the constraints bounds.

When the solver completes, it will have overwritten the values of the input cells by the final results values.

A command is the standard mechanism utilized by an Add-In for evaluating formulas in Excel. Values for the independent cells are changed and the dependent formulas cells are recalculated by the spreadsheet application engine. Several available Add-Ins related to optimization and differential equations problems utilize the command approach to extend Excel utility. Frontline Systems Inc. offers through its website, Solver.com, a suite of solvers for optimization problems that are limited to algebraic and stochastic models. In contrast, solvers for differential equations in Excel have been rather limited. Polymath Software claims on their website, Polymath-Software.com, that their ODE_Solver Add-In to Excel is the only available solver for ordinary differential equations in Excel. Polymath ODE_Solver is described by Shacham et al in the paper: "Closing the Gap between Numerical Software Package and Spreadsheet Users in Process Computations" published in the proceedings ASEE Annual Conference, 2005 and is available online at Polymath-Software.com. ODE_Solver is based on the command approach, and is incapable of supporting constrained optimization on the differential equations. Joseph Billo, in his book titled: "Excel for Scientists and Engineers", WILEY-INTERSCIENCE 2007, describes several command-based Visual Basic for Application (VBA) recipes to solve differential equations models in Excel. Similar to Polymath solver, these methods rely on the command approach for evaluating system formulas and are only suitable for simulating standalone, pre-configured differential equations, but are incapable of supporting constrained optimization of such systems.

An Excel command behavior differs fundamentally from a spreadsheet function because it mutates its inputs, and can trigger additional actions. Furthermore, as described in the article "Excel Commands, Functions, and States" which is available online from Microsoft MSDN library, commands cannot be invoked programmatically from spreadsheet functions, and they are never called by Excel during a recalculation. Commands are designed as interactive tools, and are not intended to be employed programmatically as re-usable functions in a tiered functional program. These restrictions limit the scope of problems that can be solved using the command mechanism.

On the other hand, the alternative mechanism for extending Excel's utility is through the addition of new spreadsheet functions. Excel permits only pure function behavior, and unlike commands, grants functions restricted access to its features through its Advanced Programming Interface (API). A pure function cannot mutate its input or any other value in Excel. It cannot evaluate formulas, and it is restricted to operating on constant inputs. Some external programs, such as MATLAB (distributed by MathWorks Inc.), offer interfaces to Excel to expose a portion of their functionality as extended Excel functions. Here, Excel primarily serves as a platform for inputting data through a proxy function while computations are performed utilizing the external program. This model permits exchange of basic data types such as numbers, but cannot be used to expose differential and optimization solvers, which require the ability to exchange and evaluate functions.

Whether utilizing the command or the function mechanisms for extending Excel spreadsheet utility, prior art has been confined to the inherent design limitations of either approach, and has been unable to extend the spreadsheet utility to compute optimal results for problems involving constrained optimization of parameterized differential equation systems.

SUMMARY

A computer method is developed for computing the value of an arbitrary formula in a spreadsheet application for provided values of one or more designated variable cells on which the formula depends explicitly or implicitly, such that no data is modified in the spreadsheet application. This method is utilized to overcome the inherent design limitations of the spreadsheet application, which restricts spreadsheet functions to operating on constant inputs.

Accordingly, several spreadsheet functions utilizing said method are developed for computing properties and responses of systems modelled by one or more variables, dependent formulas, and parameters. Furthermore, an optimization process is developed which is carried out by spreadsheet functions utilizing said method, and arranged in a functional paradigm in a spreadsheet application. The process computes optimal parameters that satisfy objective constraints on the response of a parameterized system modelled by formulas, variables, and parameters in a spreadsheet application.

A plurality of novel spreadsheet functions and the optimization process utilizing said method are incorporated in a computer program which extends Microsoft Excel spreadsheet application as an Add-In. The program can be executed on any computer hardware configuration that supports running Excel spreadsheet application. Several illustrative problems are solved using said program and presented as examples.

BRIEF DESCRIPTION OF THE DRAWINGS

The figures include several flowcharts detailing the algorithms developed to support the disclosure, as well as additional illustrative results for the embodiments. Related flowcharts have been assigned the same figure number but with different alphabetic suffixes.

DETAILED DESCRIPTION

Figure 1:
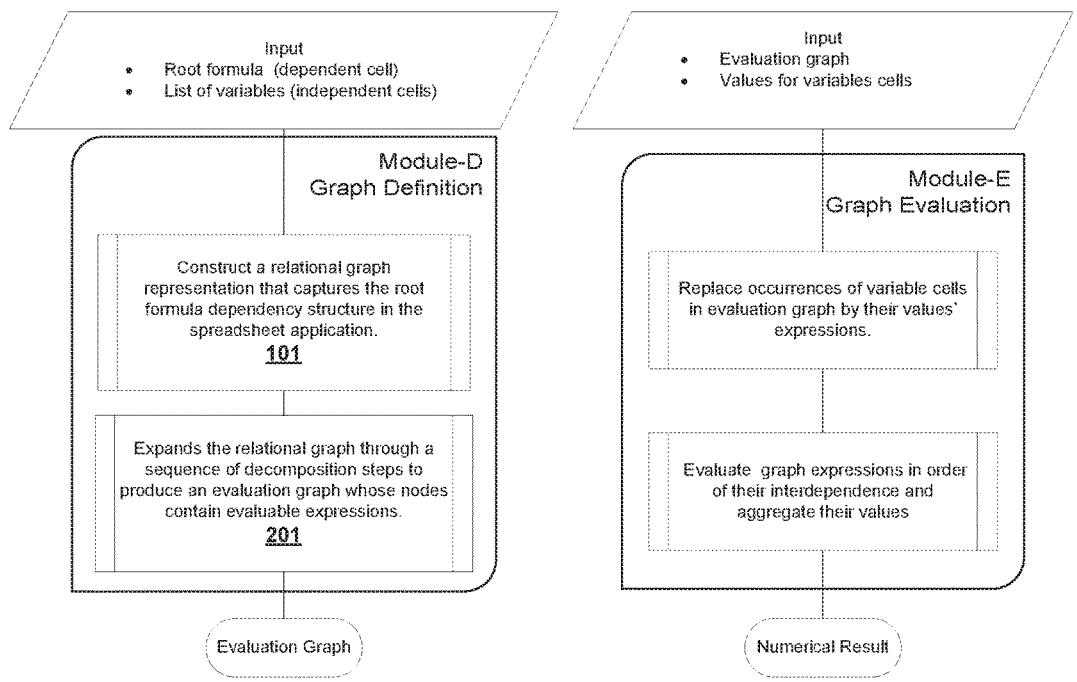
FIG. 1 shows two flowcharts providing high-level descriptions for Modules-D & E, which support the method for circumventing spreadsheet function limitations. Module-D has two processes 101 and 201 shown in the figure by numerals.

In order to develop a process for carrying out the constrained optimization of a parameterized system of differential equations in a spreadsheet application, it is imperative to adopt a functional formulation. In a functional formulation, the response of the differential system is obtained by means of a spreadsheet function that can be evaluated repeatedly for arbitrary values of its inputs parameters as required by the optimization process. As pointed out earlier, a command is not employable as a re-usable function in a tiered functional formulation, because it cannot be invoked programmatically from spreadsheet functions. Furthermore, it lacks the required properties of purity and recursion, which are attributes of functions only. A pure function does not mutate its inputs or produce any side effects, and evaluates to a deterministic value for a given input, while a recursion property allows the function to invoke itself with different inputs. Therefore, the inherent design limitations of the spreadsheet application, which restrict spreadsheet functions to operating on constant inputs only, must be overcome to make a functional formulation feasible.

Accordingly, a method is developed which enables a spreadsheet function to receive and evaluate formulas, and not just constant inputs, while preserving its purity and recursive properties. The method represents a breakthrough in the utilization of the spreadsheet application, and forms the basis for the creation of new class of unconventional spreadsheet functions that have never existed in a spreadsheet application before. The method is described next following a brief description of the spreadsheet application's basic concepts. The provided description is based on the Excel spreadsheet application (that is, a native spreadsheet software program executable over an operating system), although the same concepts apply to other spreadsheet programs including Google's spreadsheet (that is, a web-based spreadsheet software program executable over a web browser software program).

Basic Spreadsheet Concepts

A worksheet in Excel is composed of a large structured grid. Each cell in the grid is referenced by its column label and row number (e.g., A1), and represents a global memory placeholder. A range of cells can be referenced as a rectangular array (e.g., A1:B3) or a union of disjoint arrays and cells (e.g., (X1, A1:A3)). A cell may store a constant value or a formula defined using basic spreadsheet syntax (e.g., '=SQRT(X1^2+Y1*Y1)'). The spreadsheet engine insures orderly evaluation of all dependent formulas upon a change in the value of any cell. A general function can thus be identified by a root formula and a list of variable cells. Nested dependency allows arbitrarily complex functions to be constructed. To motivate the possibilities, consider the formula '=SUM(X1:Z1)' assigned to A1, the pair (A1, Y1) identifies the function $f(y)=X1+y+Z$, where X1 and Z1 are treated as constant values. In another example, consider the formula '=1+COS(B1)' assigned to A1, and the formula '=SQRT(ABS(X1))' assigned to B1, the pair (A1,X1) identifies the function $f(x)=1+cos(\sqrt{|x|})$.

Excel provides a standard mechanism for integrating a new spreadsheet function, and an Advanced Programming Interface (API) to enable the added function to interact programmatically with its core operations and engine. Documentation of the API as well as associated software development kit are available online from Microsoft Office Developer Center. Through the API, a spreadsheet function is permitted to do the following:

Obtain the value of any cell.

Obtain the formula expression stored in any cell.

Evaluate a built in worksheet function by supplying its name and values for its parameters.

Evaluate the value of a short formula expression provided the expression length is within a specified limit. (Currently set at 255 characters.)

On the other hand, a spreadsheet function is not permitted by the API to:

Change the value of any cell except for producing a result in its own assigned memory.

Recalculate or evaluate any dependent formulas cells.

These two operations are permitted for commands only.

Method for Circumventing Spreadsheet Function Limitations

FIG. 1 shows a high level flowchart of a method designed to circumvent spreadsheet restrictions, and enable a spreadsheet function to passively evaluate an arbitrary formula for any values of its list of variable cells, without modifying any data in the spreadsheet application. The method is comprised of two modules:

I. Module-D, which represents the formula as an expanded graph of relational nodes containing evaluable expressions via the Excel API, and II. Module-E, which, given values for the variable cells, evaluates the relational graph to compute the formula value.

In the following, a detailed description is provided for Modules-D & E of the enabling method.

I. Description of Module-D: FIGS. 1 to 5C

Module-D, shown in FIG. 1, comprises processes 101 and 201, which are executed on a computer having a processor and memory, and configured to run Excel spreadsheet application:

1. Process 101: captures the definition of the formula from Excel and constructs a relational graph of nodes representing its inter-dependence on nested formulas.
2. Process 201: expands the relational graph produced by process 101 through a sequence of decomposition steps to produce an evaluation graph whose nodes contain evaluable expressions via the Excel API. Process 201 also identifies special function calls in the graph to support recursion.

Processes 101 and 201 employ a number of algorithms to accomplish their tasks. These algorithms are described in detail next, starting with algorithm 101T, which is utilized in process 101 to tokenize a formula into a list of substring tokens.

Figure 2A:
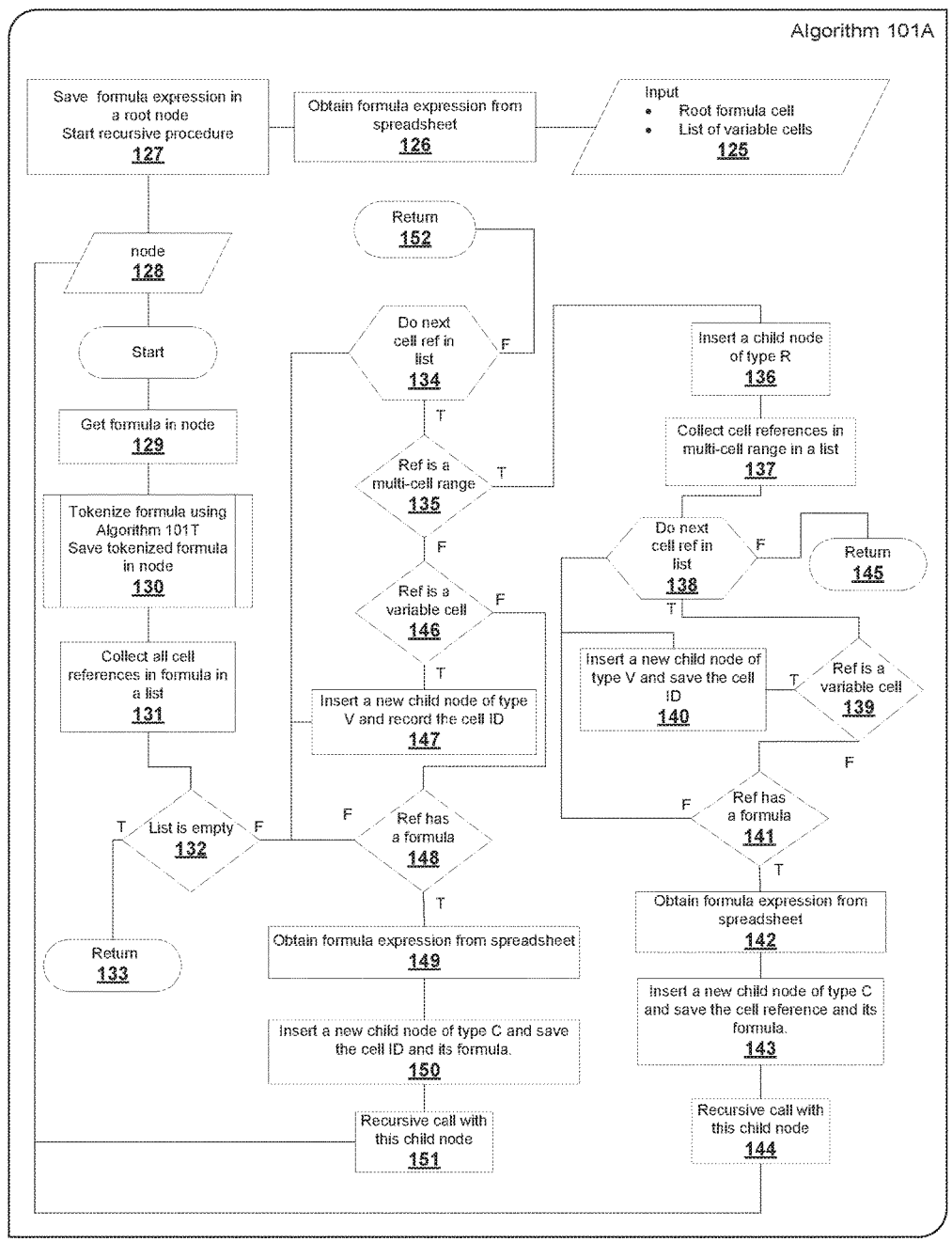
FIGS. 2A and 2B show flowcharts for algorithms 101A and 101B, which are utilized by process 101 of Module-D in the construction of a graph representation of a formula.
Figure 2B:
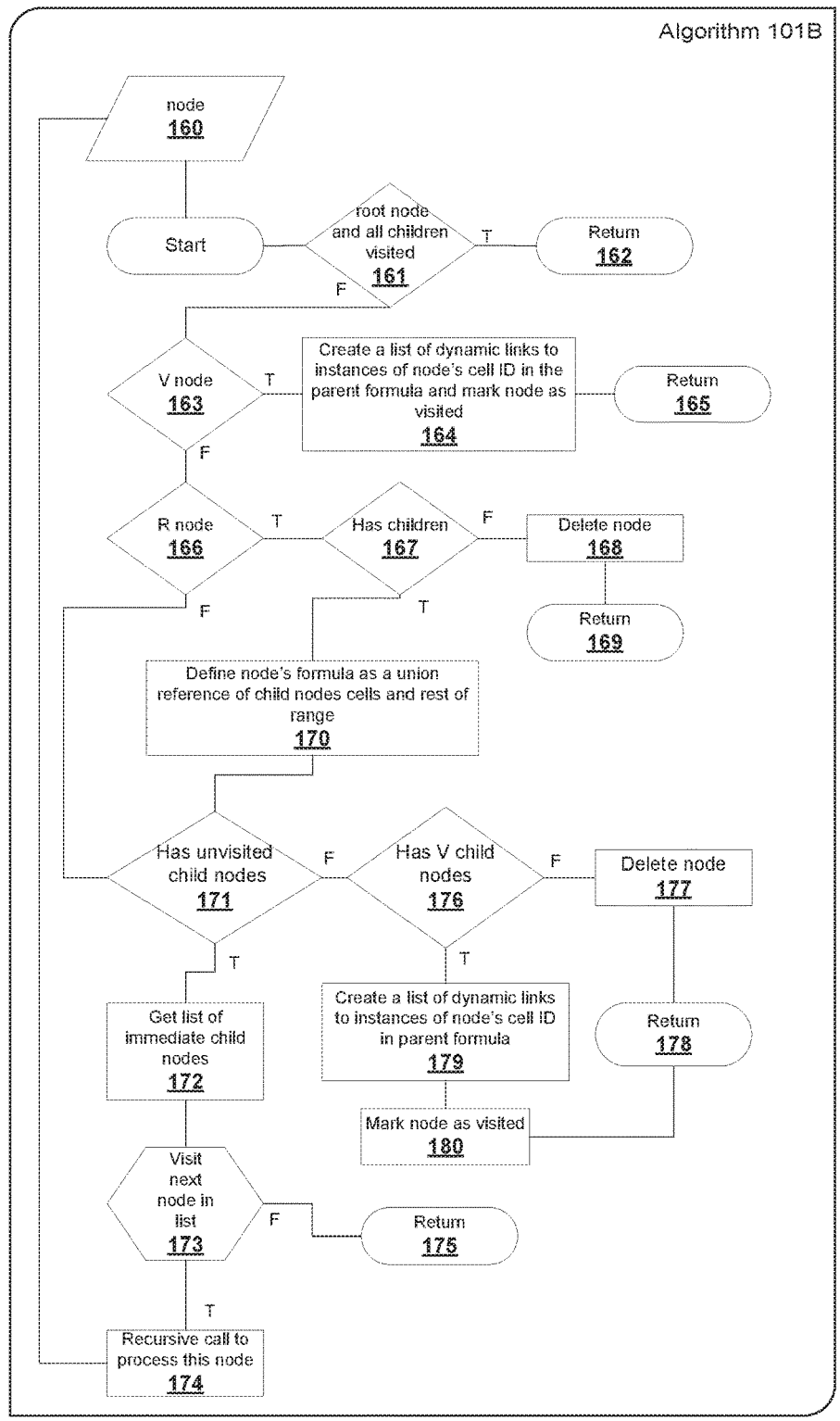
Figure 2T:
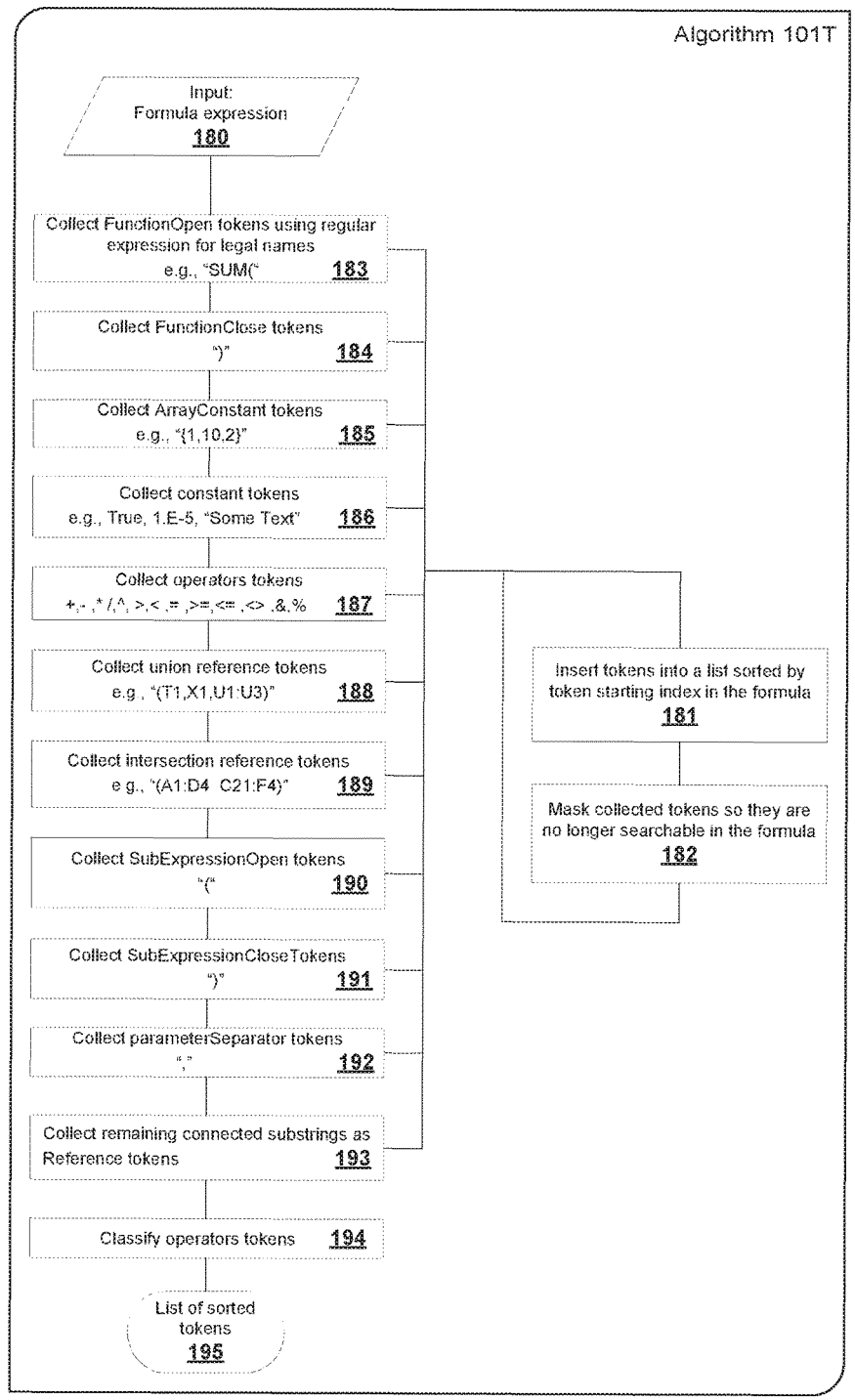
FIG. 2T shows flowchart for algorithm 101T which is utilized in algorithms 101A of Module-D for tokenizing a formula expression.

Description of Algorithm 101T: FIG. 2T

An Excel formula can contain any number of the following basic types: Functions, References, Constants and Operators. An Excel formula expression can be decomposed into a sequence of substrings, (aka tokens), such that each substring represents a logical building entity of the entire expression. Algorithm 101T uses consecutive ordered search steps to identify and collect the tokens shown in Table 1 in any given formula expression.

TABLE 1

| Token Type | Significance |
| --- | --- |
| FunctionOpen | start of a function call |
| FunctionClose | closing parenthesis of a function call |
| ParameterSeparator | a comma separating function parameters |
| SubExpressionOpen | start of a grouped algebraic subexpression |
| SubExpressionClose | closing parenthesis of a grouped algebraic subexpression |
| Reference | Excel cell or range reference |
| Constant | literals, numbers, and Excel Booleans and error values |
| ArrayConstant | a list of numbers enclosed by curly brackets { } |
| PreFixOperator | unary −, + sign operator |
| InFixOperator | +, −, *, /, ^, >, <, =, >=, <=, <>, & operators |
| PostFixOperator | % operator |

FIG. 2T shows a flowchart for algorithm 101T ordered search steps. After each search step, the collected tokens are inserted in a list sorted by the token starting index in the formula expression 181, and the corresponding substrings in the formula are masked so they are ignored in the next search step of the formula 182. Staring from an input formula expression 180:

1. Collect FunctionOpen tokens: use a regular expression representing a legal name identifier followed immediately by "(" 183.
2. Collect FunctionClose tokens: search for a matching ")" for each collected functionOpen token 184.
3. Collect ArrayConstant tokens: search for any text enclosed by a pair of curly brackets{ } 185.
4. Collect Constant tokens: use a regular expression for numeric constants; search for a pair of double quotes for literals; search for Excel constants for Booleans and errors 186.
5. Collect operators (without classification yet): search for +, −, *, /, ^, >, <, =, >=, <=, < >, &, % 187.
6. Collect union references: search for pairs of matching parenthesis that contain commas but no other parenthesis. Collect each pair as a Reference token 188.
7. Collect all intersection references: search for pairs of matching parenthesis that contain white spaces separating other text but no commas or other parenthesis. Collect each pair as a Reference token 189.

8. Collect SubExcpressionOpen tokens: search for a beginning "(" 190.
9. Collect SubExpressionClose tokens: search for a matching ")" 191.
10. Collect ParameterSeparator tokens: search for commas 192.
11. Collect each remaining substring among collected tokens as a Reference token 193.
12. Classify collected operators tokens as pre-, in-, or post-fix operators 194.

Algorithm 101T returns an ordered list of tokens for the input formula expression upon completion 195. For example, applying the above procedure to the formula expression $$\text{`=-1+EXP}((X1-1)^\wedge 2*\text{SIN}(Y1))+\text{SUM}(A1:C4,D1)+\text{IF}(P5>=0,P6,P7\%)\text{'}$$

produces the list of tokens shown in Table 2.

TABLE 2

| Token No. | Text | Type |
|---|---|---|
| 0 | "=" | Formula Start |
| 1 | "−" | PreFix Operator |
| 2 | "1" | Constant |
| 3 | "+" | InFix Operator |
| 4 | "EXP(" | FunctionOpen |
| 5 | "(" | SubExpressionOpen |
| 6 | "X1" | Reference |
| 7 | "−" | Infix Operator |
| 8 | "1" | Constant |
| 9 | ")" | SubExpressionClose |
| 10 | "^" | Infix Operator |
| 11 | "2" | Constant |
| 12 | "*" | Infix Operator |
| 13 | "SIN(" | FunctionOpen |
| 14 | "Y1" | Reference |
| 15 | ")" | FunctionClose |
| 16 | ")" | FunctionClose |
| 17 | "+" | Infix Operator |
| 18 | "SUM(" | FunctionOpen |
| 19 | "A1:C4" | Reference |
| 20 | "," | ParameterSeparator |
| 21 | "D1" | Reference |
| 22 | ")" | FunctionClose |
| 23 | "+" | Infix Operator |
| 24 | "IF(" | FunctionOpen |
| 25 | "P5" | Reference |
| 26 | ">=" | Infix Operator |
| 27 | "0" | Constant |
| 28 | "," | ParameterSeparator |
| 29 | "P6" | Reference |
| 30 | "," | ParameterSeparator |
| 31 | "P7" | Reference |
| 32 | "%" | PostFix Operator |
| 33 | ")" | FunctionClose |

Description of Process 101 of Module-D: FIGS. 2A to 3B

Process 101 employs algorithms 101T, 101A and 101B to capture the definition of a formula from Excel, and construct a relational graph of nodes representing its dependence on nested formulas. FIG. 2A shows the flowchart of algorithm 101A which takes as inputs a root formula cell and a list of variable cells 125. It obtains the cell formula expression using Excel API 126, and creates a root node 127 representing the root formula, and then executes a recursive procedure that performs the following steps on the current node 128: it gets the recorded formula expression in the node 129, and applies algorithm 101T to tokenize the formula, then records the tokens in the node 130. Next, it collects the list of references in the tokens 131. If the list is empty 132, it ends processing for the current node and returns 133. Otherwise, it iterates over the references list 134 and performs either a) or b) below depending whether the reference is a multi-cell range or a single cell 135:

a) If the reference represents a multi-cell range, algorithms 101A inserts a child node of type R which records the multi-cell range ID 136. Using Excel API, it obtains the list of cells in the range 137 and iterates through each cell to perform the following steps 138: If the cell ID matches any of the variable cells 139, it inserts a child node of type V which records the variable cell ID 140, then continues to process the next cell 138. Otherwise, if the cell contains a formula 141, it obtains the formula expression using Excel API 142, and inserts a child node of type C which records the cell ID and its formula expression 143. The Procedure then calls itself recursively to process the new child C node it just created 144 or returns when it completes iterating through the cells in the range 145.

b) If the reference represents a single cell 135 and it matches any of the variable cells 146, algorithm 101A inserts a child node of type V which records the variable cell ID 147, then continues to process the next cell in the list 134. Otherwise, if the cell contains a formula 148, it obtains its expression from Excel API 149, and inserts a child node of type C, which records the cell ID and the formula 150, then calls itself recursively to process the new child node it just created 151, or returns when it completes iterating through the references list 152.

Figure 3A:
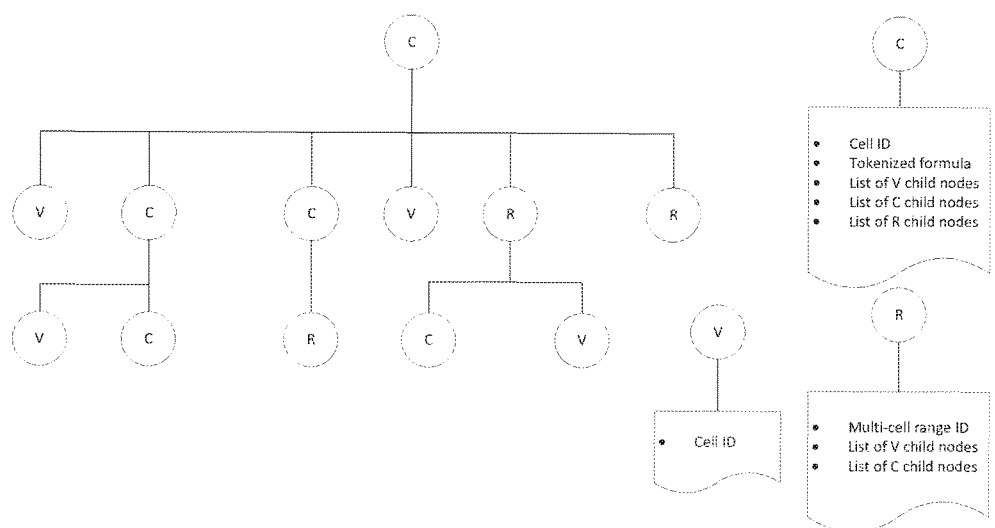
FIGS. 3A and 3B show sample output graphs produced by algorithms 101A and 101B of Module-D.

FIG. 3A shows a sample graph outcome at the completion of algorithm 101A. The graph contains any number of three types of nodes: C, R and V. Nodes of type C contain a cell ID, a tokenized formula expression, and any number of child nodes of types V, C and R. Nodes of type R contain a multi-cell range ID, and any number of child nodes of types C and V. Nodes of type V contain a variable cell ID and can only exist as leaf nodes.

The second step of Process 101 applies algorithm 101B to the graph produced by algorithm 101A. FIG. 2B shows the flowchart for algorithm 101B, which employs a recursive procedure that traverses the graph and deletes nodes of types C or R with no immediate or remote children nodes of type V, while setting up interdependence information for retained nodes. Starting at the root node of a graph with unvisited nodes 160, recursive algorithm 101B first checks if the current node is the root node and has all its children visited 161. If true, algorithm 101B terminates processing and returns 162. Otherwise, depending on the node type, algorithm 101B performs any of the following procedures a), b) or c):

a) If the current node is a V node 163, it creates a list of dynamic links to instances of the V node's cell ID in the parent node's tokenized formula expression, and marks the V node as visited 164. It then ends processing for the current V node and returns to the next sibling or parent 165.

b) If the current node is an R node 166 with no children 167, it deletes it 168, ends processing for the current R node and returns to the next sibling or parent 169. Otherwise, if the R node has children 167, it performs the following steps on the R node:

1. It defines an equivalent union reference representation for the multi-cell range node 170. The union reference is defined as the union of the immediate child node cells and the remaining non-child cells in the range.
2. It tokenizes the union reference expression and records it as the R node's formula 170.

If the R node has unvisited children 171, algorithm 101B obtains the list of immediate child nodes for the R node 172, iterates through the child node list 173, and calls itself recursively for each child node 174. When algorithm 101B completes iterating through the child node list, it ends processing for the current R node and returns to the next sibling or parent 175.

c) If the current node is a C node and has unvisited children 171, algorithm 101B obtains the list of immediate child nodes for the C node 172, iterates through the child node list 173, and calls itself recursively for each child node 174. When algorithm 101B completes iterating through the child node list, it ends processing for the current C node and returns to the next sibling or parent 175.

Algorithm 101B repeats until it reaches a leaf node without unvisited child nodes 171. If the leaf node does not have child nodes of type V 176, it deletes the leaf node 177 and returns to the next sibling or parent 178. Otherwise, it performs the following steps on the leaf node:
1. It creates a list of dynamic links in the node to instances of the node's cell ID in the parent node's tokenized formula expression 179.
2. It marks the node as visited, reducing the count of unvisited nodes for the parent node 180.

Algorithm 101B then ends processing for the current leaf node and returns to the next sibling or parent 178.

Figure 3B:
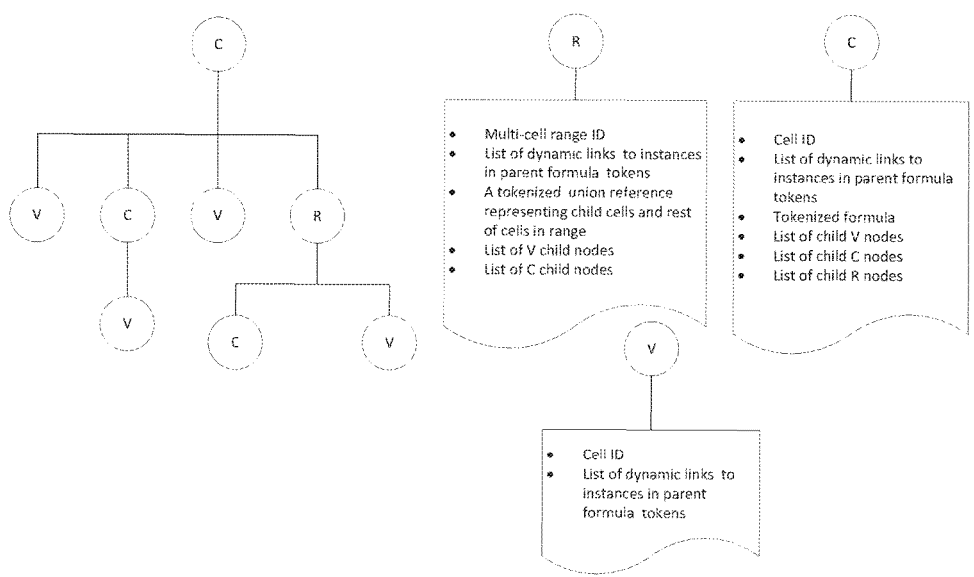

Algorithm 101B terminates when it returns to the root node after visiting all nodes in the graph. FIG. 3B shows a possible outcome of algorithm 101B when applied to the graph shown in FIG. 3A. FIG. 3B also shows the recorded information in the different types of nodes in the graph at the completion of process 101.

Description of Process 201 of Module-D: FIGS. 4A to 5C

Figure 4A:
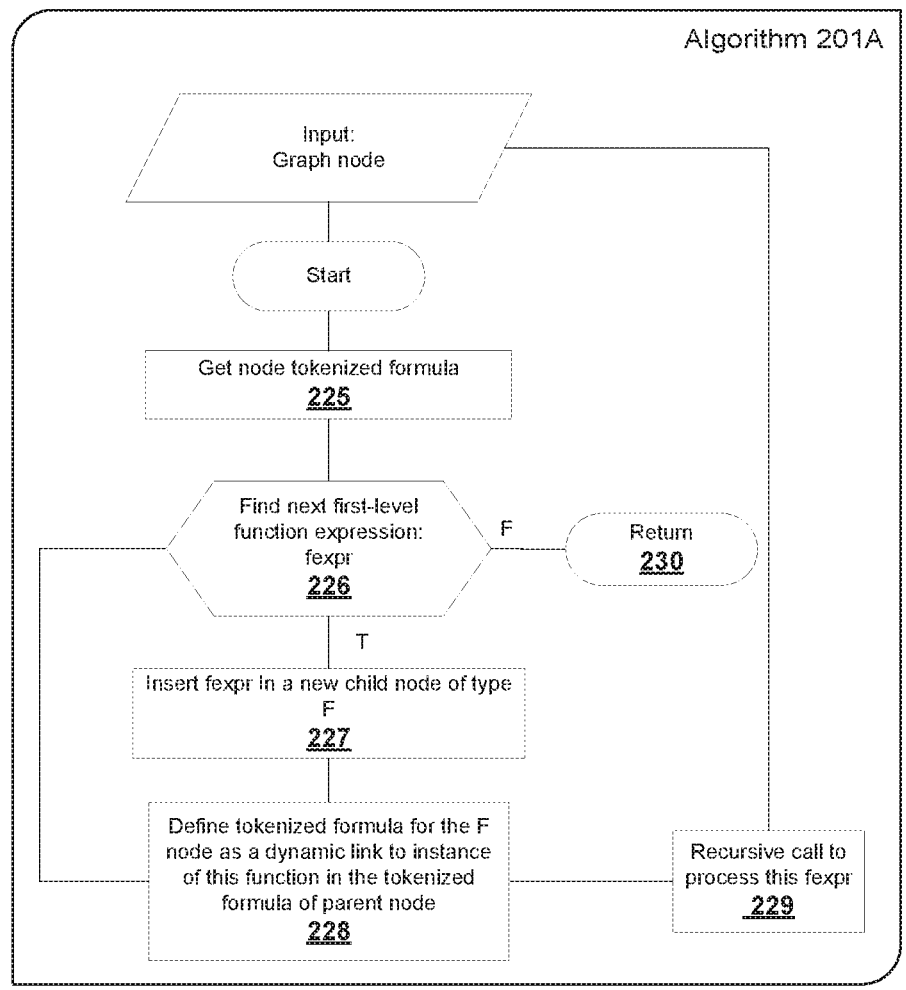
FIGS. 4A to 4C show flowcharts for algorithm 201A, 201B and its helper procedure 201B-H, and 201C and its helper procedure 201C-H, which are utilized by process 201 of Module-D for further processing of the graph representation.
Figure 5A:
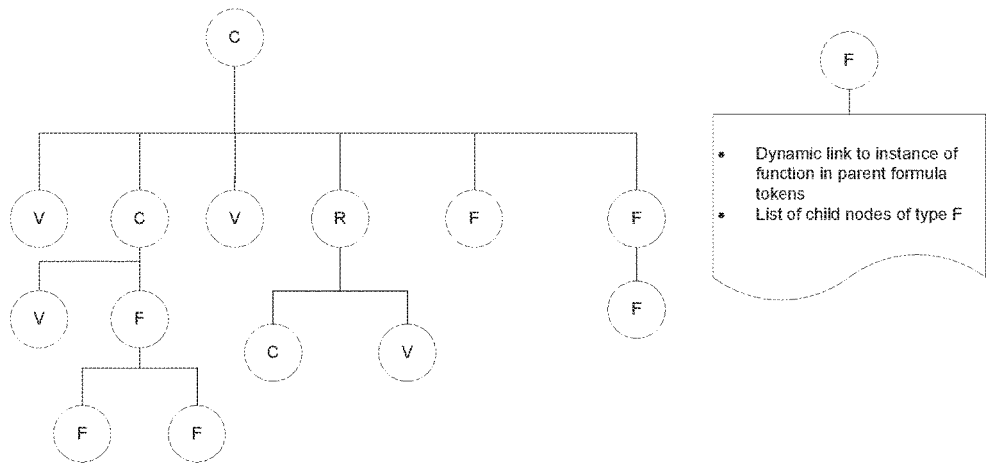
FIGS. 5A to 5C show sample output graphs produced by algorithms 201A, 201B, and 201C of Module-D.

Process 201 employs algorithms 201A, 201B and 201C to expand the relational graph produced by process 101 into an evaluation graph whose nodes contain expressions evaluable via the Excel API. FIG. 4A shows the flowchart for algorithm 201A, which visits every node of type C in the graph and attaches a sub graph of type F nodes representing the hierarchy of function calls present in the formula expression of the node. From the tokenized formula of the current C node 225, algorithm 201A collects and iterates over the first-level function call expressions present in the formula 226. It inserts a node of type F for each first-level function call expression 227, and defines a formula for the F node as a dynamic link to the instance of this function expression in the tokenized formula of the parent node 228. Algorithm 201A then calls itself recursively to process the formula of the newly inserted child F node 229. It returns when there are no more first-level function expressions in the current node's tokenized formula 230. FIG. 5A shows a possible expanded output graph of algorithm 201A when applied to the graph shown in FIG. 3B. Algorithm 201A serves two purposes:
1. It helps reduce the overall formula expression length in a parent node to meet the length limit requirement of the Excel API. This is because each extracted nested function call expression is replaced in the parent node formula by its shorter equivalent value during evaluation. However, the graph may still contain nodes of type C or F that are longer than the admissible length for the Excel API. These nodes are further processed by algorithms 201B and 201C described next.
2. It isolates all nested functions calls present in the formulas of the graph. This is required to identify and handle special recursive function calls present in the graph during the evaluation, which is described afterwards.

Figure 4B:
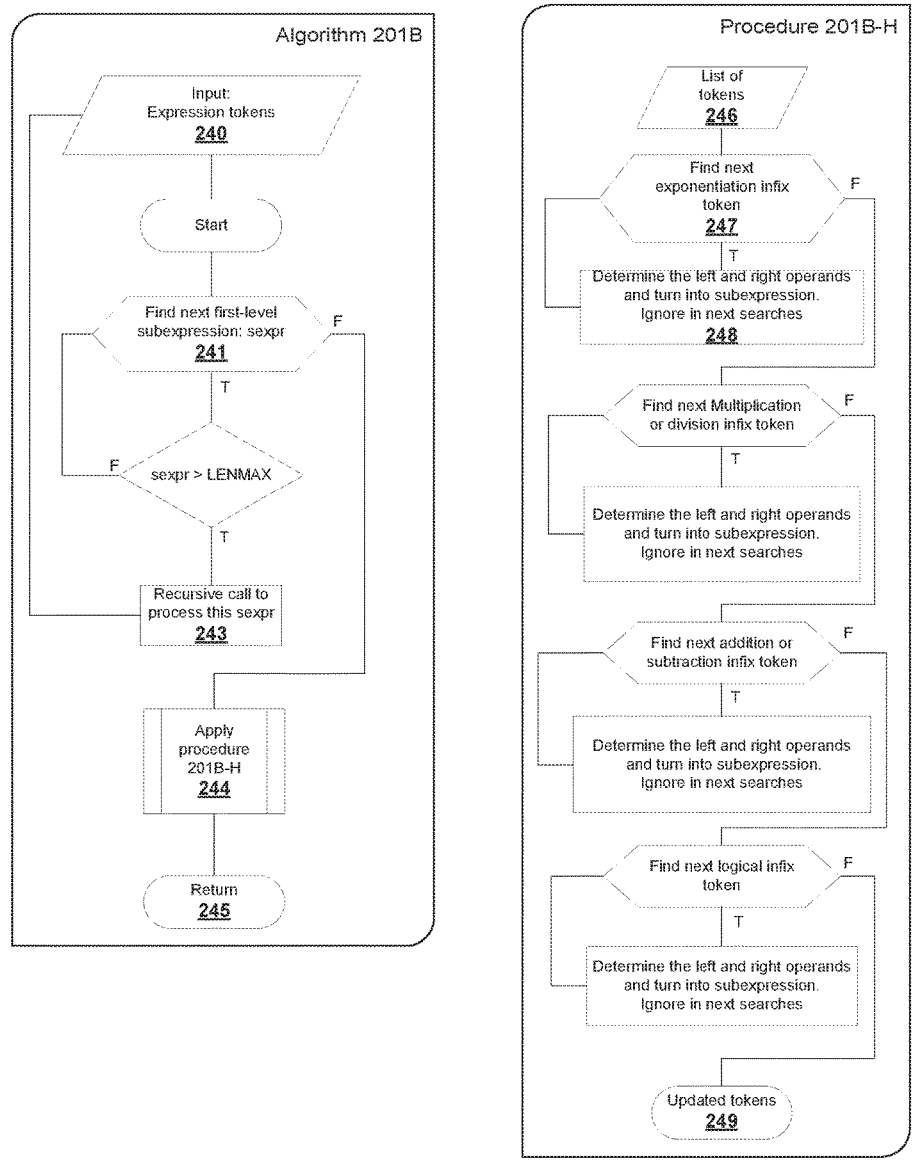

Algorithms 201B and 201C are utilized next for further processing of the nodes' expressions to meet Excel API expression evaluation length limit, LENMAX. Algorithm 201B is shown in the flowchart of FIG. 4B. It regroups every infix operator and its two operands into a subexpression, while respecting order precedency of the operators. Starting with a tokenized input expression 240, algorithms 201B uses recursion to locate any pre-existing subexpression in the input whose length exceeds LENMAX. A subexpression is a sequence of tokens starting with a token of type SubExpressionOpen and ending with a token of type SubExpressionClose. Algorithm 201B collects and iterates over the first-level subexpressions present in the tokenized input expression 241, and calls itself recursively to process any first-level subexpression, sexpr, whose length exceeds the Excel API length limit, LENMAX 243. When no more subexpressions are found in the current input expression, algorithm 201B applies procedure 201B-H to break up the current input expression 244, then terminates processing of the current input expression and returns from the current recursive call 245.

Helper procedure 201B-H, which is shown in FIG. 4B, searches its input for the next infix operator in order of precedence, and regroups it with its left and right operands into a new subexpression. An operand may be a reference, a subexpression, or function call. Procedure 201B-H ignores a regrouped subexpression in its searches and treats it as an operand. Starting with an input list of expression tokens 246, procedure 201B-H searches for any exponentiation infix operator 247, and groups it with its left and right operands into a new subexpression 248. Procedure 201B-H repeats the same process for the remaining infix operators in the following order: multiplication, division, addition, subtraction, and logical as shown in the flowchart of FIG. 4B. When all infix operators present in the input tokens have been grouped with their operands, procedure 201B-H terminates and returns the updated list of regrouped tokens 249.

As an example, algorithm 201B transforms the following input expression $$A+B*C*D-(E-F*G)^\wedge(H-1)+J*K/L-M$$

into $$(((A+((B*C)*D))-((E-(F*G)^\wedge(H-I)))+(((J*K)/L)-M)).$$

Figure 4C:
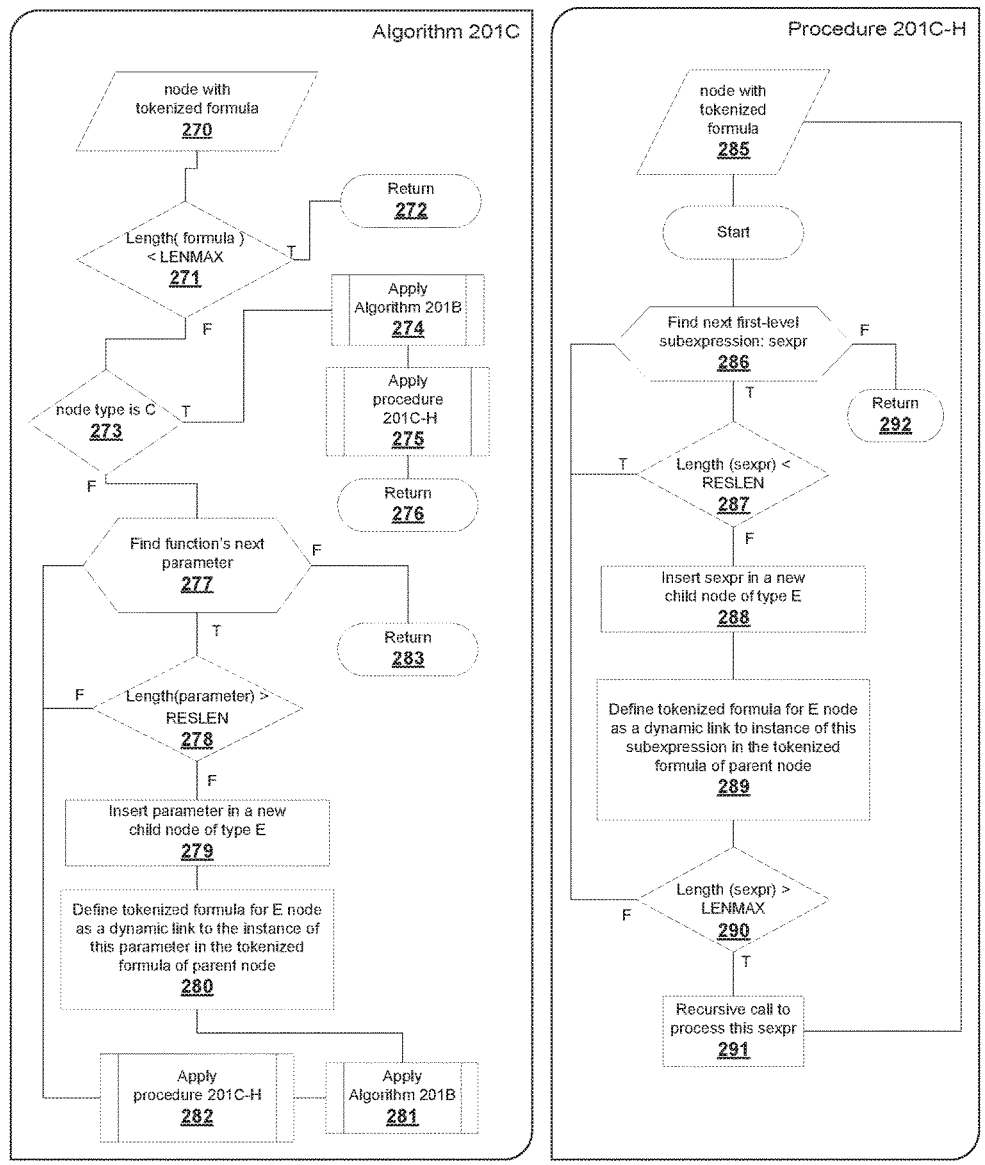

Algorithm 201B is utilized by algorithm 201C for representing long expressions in the graph nodes by an equivalent sequence of evaluable subexpressions. FIG. 4C shows the flowchart for algorithm 201C which is applied to every node of type C or F in the graph. Algorithm 201C attaches an evaluation sub graphs of type E nodes to any C or F node whose formula expression length exceeds the Excel API evaluation limit, LENMAX. Starting at a node with tokenized formula expression 270, if the expression length is within the Excel API evaluation limit 271, algorithm 201C terminates processing of the node and returns 272. Otherwise, if the node type is C 273, algorithm 201C applies algorithm 201B to regroup the node's formula into a sequence of binary arithmetic subexpressions 274, followed by applying procedure 201C-H to the node's regrouped formula to attach the sub graph of type E nodes 275. Algorithm 201C then ends processing of the current node and returns 276. On the other hand, if the node type is F 273, algorithm 201C iterates over the function parameters 277, and inserts a new node of type E 279 for any function parameter whose expression length is greater than its equivalent value length, RESELN 278. Algorithm 201C then defines the E node's formula as a dynamic link to the instance of this parameter in the tokenized formula of the parent node 280. It then applies algorithm 201B on the newly created E node to regroup its expression into a sequence of binary arithmetic subexpressions 281, followed by applying procedure 201C-H to attach a sub graph 282. Algorithm 201C then either processes the next parameter of the function 277, or returns if there are no more parameters 283.

Helper procedure 201C-H is shown FIG. 4C. Starting with an input tokenized formula expression 285, procedure 201C-H collects and iterates over the first-level subexpressions present in the input expression 286. It inserts child node of type E 288 for each first-level subexpression, sexpr, longer than its equivalent value length, RESLEN 287, and defines its formula as a dynamic link to the instance of sexpr in the tokenized formula of the parent node 289. If the length of sexpr exceeds the Excel API limit, LENMAX 290, procedure 201C-H calls itself recursively on the E node to process any nested subexpressions within sexpr 291. Procedure 201C-H returns from the current recursive call 292 when there are no more subexpressions in the input expression, or when all subexpressions are within admissible length.

Figure 5B:
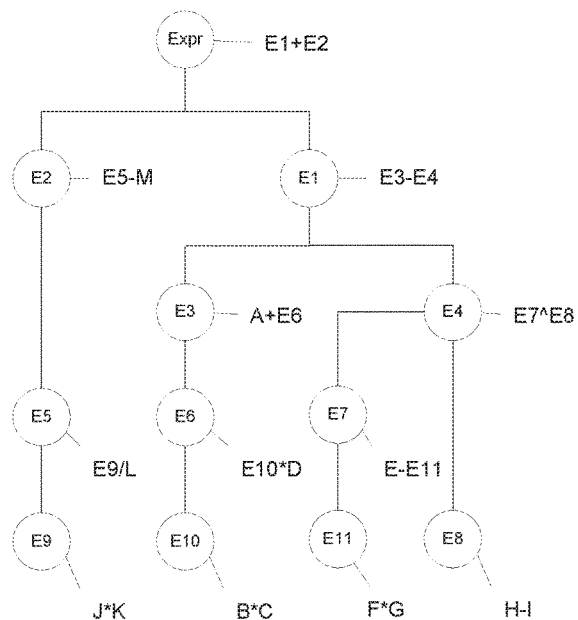
Figure 5C:
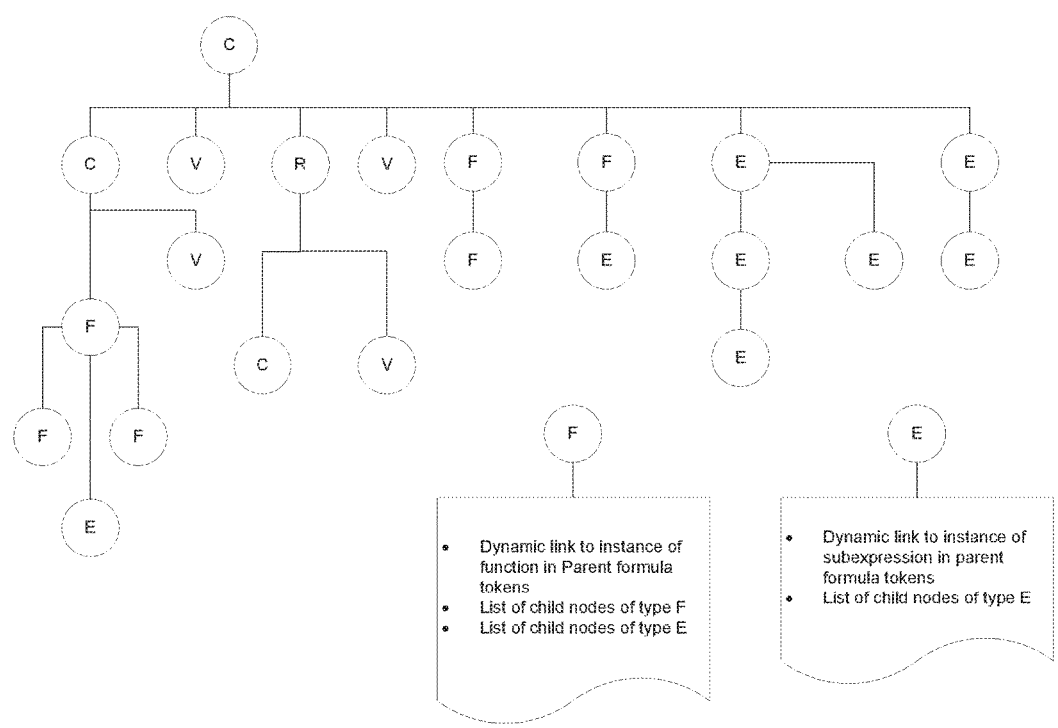

FIG. 5B shows a sub graph of type E nodes for the regrouped example MA+((B*C)*D))−((E−(F*G))^(H−I)))+(((J*K)/L)−M)). FIG. 5C shows a possible outcome of algorithm 201C when applied to the graph shown in FIG. 5A, along with the recorded data in the F and E nodes at the completion of process 201.

The actual structure of an evaluation graph produced by Module-D depends on the complexity of the formula it represents. It is still possible that output of Module-D may contain nodes of type F with functions expressions that are irreducible below the Excel API evaluation limit, due to too many parameters or an expanded long union reference parameter. Since a function expression must be evaluated in whole to form a valid evaluable expression, Excel API expression evaluation method cannot be used to evaluate such long function expressions. This special case is handled by a sub process part of Module-E, using an alternative Excel API method that computes the function directly by supplying its label identifier and list of its parameter values.

Figure 6:
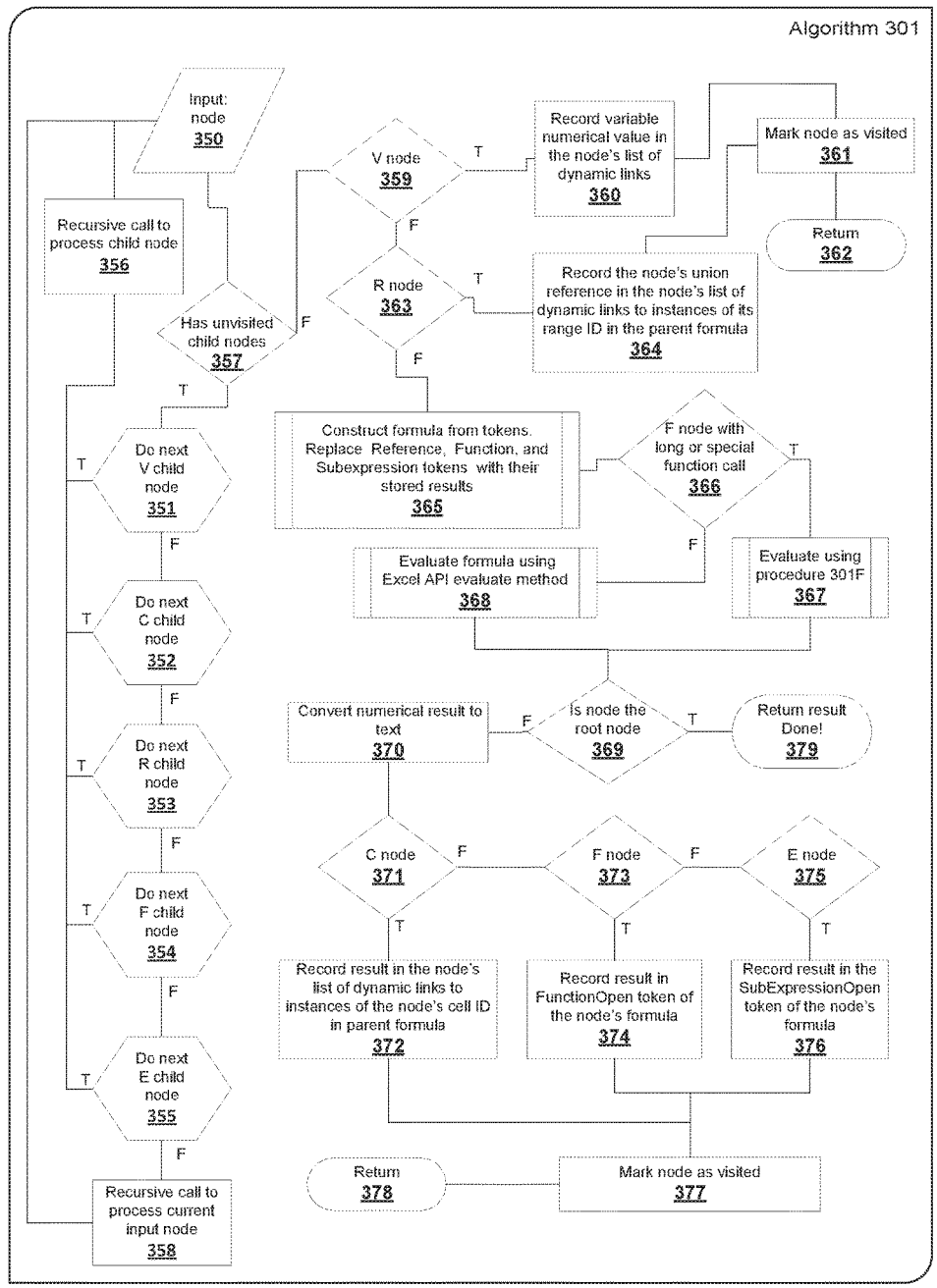
FIG. 6 shows flowchart for algorithm 301, which is utilized by Module-E for evaluating the graph produced by Module-D.

II. Description of Module-E: FIG. 6

Module-E is executed on a computer having a processor and memory and configured to run Excel spreadsheet application. It computes the value of the formula represented by the evaluation graph produced by Module-D, for the given values of the variable cells. Module-E employs algorithm 301, which traverses the tree structure, visiting child nodes in a prescribed order until a leaf node is reached. It computes its value, updates its parent formula expression, and drops the leaf node (i.e., mark it as visited). When a parent node loses all its child nodes, it becomes a leaf itself. The process is repeated until all leafs have been dropped and the root parent node is reached. Computing the value of the root node formula expression produces the final value of the formula represented by the graph.

FIG. 6 shows the flowchart for algorithm 301, which starts at the root node of an evaluation graph with unvisited nodes 350. It iterates through the unvisited child nodes lists of the current input node in the following order: V 351, C 352, R 353, F 354, and E 355 and calls itself recursively for each child node in a given list 356 until it reaches a leaf node without any unvisited child nodes 357. When algorithm 301 completes iterating through all child nodes of the current input node, it calls itself recursively on the current input node 358 which becomes a leaf itself after all its children have been marked visited.

If the leaf node is a V node 359, algorithm 301 records the provided numerical value of the variable cell ID in the node's list of dynamic links 360. It marks the V node as visited 361 and returns from the recursive call to the next sibling or parent node 362. Otherwise, if the leaf node is an R node 363, algorithm 301 records the expanded union reference expression of the R node in its list of dynamic links 364. It marks the R node as visited 361, and returns from the recursive call to the next sibling or parent node 362.

On the other hand, if the current node is a C or F node, algorithm 301 forms the expression of the node's formula from its list of dynamic link tokens while replacing any reference, function call, or subexpression containing recorded result values by its value expression 365. The design of the evaluation graph and the order of child nodes evaluations ensure that the formula expression formed for a type C or E leaf node is evaluable by the Excel API evaluation method. However for a type F leaf node, the formula which contains a function call may potentially exceed the Excel API length limit for expression evaluation, or it may contain a recursive special function call 366. Such an F node is evaluated using procedure 301F which handles both long and special function calls 367. Special functions are not part of the standard built-in library of worksheet functions in Excel. They are part of the Add-In to Excel, and include a set of computational functions described in the following section. These Add-In functions have available procedures that can be executed directly by Module-E by supplying their current parameters in the graph. This achieves recursion naturally in the event the root formula contains an Add-In function call that is referenced again in a nested graph node. On the other hand, a long function call that is part of the standard Excel library of worksheet functions is evaluated by means of the Excel API by providing the function name identifier and the list of values for its parameters. On the other hand, a regular C, E or F node is evaluated directly by means of the Excel API expression evaluation method 368.

If the current leaf node is not the root node 369, algorithm 301 converts the evaluated node result to textual expression 370, and performs one of three steps:

If the leaf node type is C 371, it records the result into its list of dynamic links to instances of the node's cell ID in the parent's formula tokens 372. During the formation of the parent's formula expression, instances of this cell ID are replaced by their stored value.

If the leaf node type is F 373, it records the result in the FunctionOpen token of the node's formula 374. During the formation of the parent's formula expression, the entire function expression will be replaced by the recorded result.

If the leaf node type is E 375, it records the result in the SubExpressionOpen token in the node's formula tokens 376. During the formation of the parent's formula expression, the entire subexpression will be replaced by the recorded result.

Since each child node's formula expression is defined by dynamic links to its parent's formula tokens, the result of a leaf node evaluation is automatically seen by the parent and siblings. Algorithm 301 then marks the leaf node as visited 377 and returns from the recursive call to the next sibling or parent node 378.

Algorithm 301 terminates when the current leaf node is the root node of the graph 369. It returns the evaluated node result, which represents the value of the formula represented by the graph 379.

The merits of the evaluation graph design are evident in the efficient and systematic incremental evaluation of the graph nodes leading to the final value of the root formula it represents. In this design, I have relied often on recursive procedures to perform the logic of the process, although alternative non-recursive procedures are also possible. Furthermore, alternative graph representations are also possible using other techniques such as S-Expressions binary trees. Other techniques are also possible for tokenizing a formula expression such as relying on grammar rules using BNF (Backus-Naur Form) or extended BNF in conjunction with a Lexer. I have also utilized the Excel API as the primary engine to evaluate the sequence of evaluable expressions in the graph nodes since it provides a natural, efficient and a readily available means for evaluating the expressions. Other means for evaluating the expressions are also possible and may be necessary in a spreadsheet application whose API does not provide an expression evaluation method. Such means may include, among other possible techniques, converting an expression to a lambda expression, or anonymous function, and utilizing a programming language environment supporting evaluations of lambda expressions. However, alternative representations, algorithms, or procedure implementations may differ in complexity but serve the same objective: the passive evaluation of an arbitrary formula in a spreadsheet for any provided values of its variable cells by means of a method executed in a separate memory location of the computer, with no side effects in the spreadsheet application.

Novel Spreadsheet Computational Functions

Figure 7:
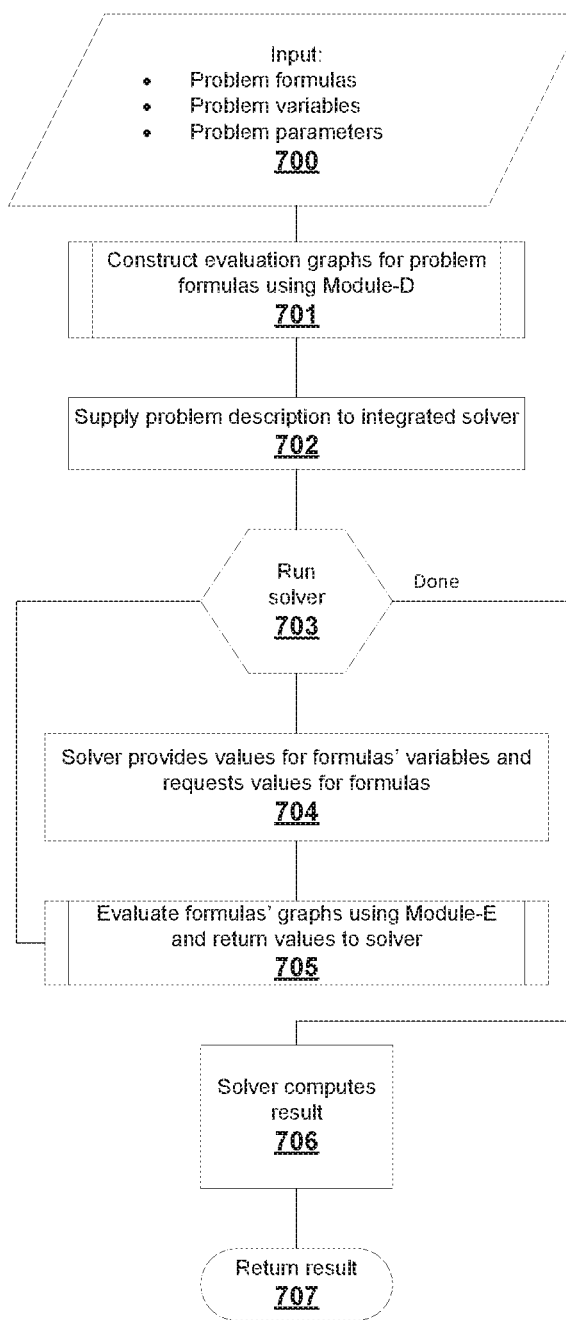
FIG. 7 shows flowchart for the main procedure used to integrate Modules-D & E and a computer algorithm to develop an unconventional spreadsheet function, which can receive and evaluate formulas to solve a problem represented by formulas and variables.

Modules-D & E enable the creation of a new class of unconventional computational spreadsheet functions that have never existed before in a spreadsheet application for solving a variety of complex models. Using Modules-D & E, a spreadsheet function can be developed to compute the response or property of any system which can be modelled by formulas, and whose response or property can be computed by means of an algorithm requiring a finite number of evaluations of the formulas. FIG. 7 shows a flowchart for the systematic procedure required to develop such a spreadsheet function. The spreadsheet function is passed parameters describing a problem model that includes formulas, designated variables, and parameters 700. To solve the problem, it executes the following steps:

1. Utilizes Module-D to construct evaluable graphs for the formulas 701.
2. Passes the model description and parameters to the appropriate integrated solver algorithm 702.
3. Starts solver 703, and utilizes Module-E to evaluate the formulas' graphs 705, and provides values to the solver whenever the solver provides values for the variables and requests values for the formulas 704.
4. Repeats step 3 until the solver computes a result 706.
5. Returns the result to the spreadsheet application 707.

The above procedure forms the basis for several developed spreadsheet functions incorporated in a computer program which integrates with Excel spreadsheet application as an Add-In. The spreadsheet functions are described below, and form the pillars of a functional formulation for a three-step constrained optimization process described afterwards. The spreadsheet functions are organized into three groups:

I. Utility functions for evaluating integrals and derivatives of general formulas.

II. Differential-algebraic systems solvers.

III. Algebraic systems of equations and inequalities solver.

Using the Add-In program, several examples are presented which illustrate the utilization of the spreadsheet functions in Excel.

I. Utility Functions:

a) Integration

The provided Excel spreadsheet function

QUADF(f, x, a, b, [options])

computes a general proper or improper integral of the form:

$$I = \int_a^b f(x)dx$$

The parameters for QUADF( ) are described below:
1. f: cell reference for the formula of the integrand.
2. x: cell reference for the variable of integration.
3. a: the lower limit of integration which may be specified as infinite.
4. b: the upper limit of integration which may be specified as infinite.
5. [options]: a list of optional parameters for integration method selection and control.

Based on the flowchart of FIG. 7, QUADF( ) uses Modules-D & E in conjunction with the QUADPACK library of fixed-order and adaptive integration routines described in the book: "QUADPACK A subroutine package for automatic integration", Springer Verlag, 1983. The use of QUADF( ) is demonstrated in the computation of the following integral in Excel:

$$I = \int_0^1 \frac{\ln x}{\sqrt{x}} dx = -4$$

The integrand formula is defined in cell A1 using cell X1 as variable. Evaluating QUADF( ) formula in cell A2 computes the integral result as shown in Table 3.

TABLE 3

| | A |
|---|---|
| 1 | =LN(X1)/SQRT(X1) |
| 2 | =QUADF(A1, X1, 0, 1) → 4 |

Similarly, Table 4 illustrates using QUADF( ) to compute the improper integral with infinite limits:

$$I = \int_{-\infty}^{\infty} e^{-x^2} dx = \sqrt{\pi}$$

TABLE 4

| | A |
|---|---|
| 1 | =EXP(−X1 * X1) |
| 2 | =QUADF(A1, X1, "−INF", "INF") → 1.772453851 | b) Multiple Integrals

Taking advantage of the recursion support by Modules-D &E, QUADF( ) can be applied recursively to compute multiple integrals of any order, such as the triple integral:

$$V = \int_0^2 dx \int_0^{3-\frac{3}{2}x} dy \int_0^{6-3x-2y} 1-x\, dz = 3$$

The computation in Excel is illustrated in Table 5. Using X1, Y1 and Z1 as variables, the integrand formula is defined in A1, and the formulas for the variable upper integration limits are defined in B1 and B2. The inner, middle, and outer integrals formulas are inserted in A2, A3 and A4 respectively, with each inner QUADF( ) formula serving as integrand for the next outer QUADF( ) formula. Evaluating the outer integral in A4 computes the triple integral value.

TABLE 5

| | A | B |
|---|---|---|
| 1 | =1 − X1 | =6 − 3 * X1 − 2 * Y1 |
| 2 | =QUADF(A1, Z1, 0, B1) | =3 − 3 * X1/2 |
| 3 | =QUADF(A2, Y1, 0, B2) | |
| 4 | =QUADF(A3, X1, 0, 2) | → 3 | c) Differentiation

The provided Excel spreadsheet function

DERIVF (f, x, p, n, [options])

computes the n$^{th}$ derivative of function $f(x)$ at a point p:

$$d = \frac{d^n}{dx^n} f(x) \big|_p$$

The parameters for DERIVF( ) are described below:
1. f: cell reference for the formula to differentiate.
2. x: cell reference for the variable of differentiation.
3. p: value for the point of differentiation.
4. n: the order of the derivative. Default value is one.
5. [options]: a list of optional parameters for differentiation method selection and control.

Based on the flowchart of FIG. 7, DERIVF( ) uses Modules-D & E in conjunction with Ridders' algorithm described in the book: "Numerical Recipes in C: The Art of Scientific Computing", Cambridge University Press, 1992. Ridders' algorithm produces superior accuracy compared to a simple finite difference scheme. DERIVF( ) is illustrated in Excel by computing the following example:

$$d = \frac{d}{dx} \frac{\ln x}{\sqrt{x}} \bigg|_{0.5} \cong 3.808685268$$

The formula to differentiate is defined in cell A1 using X1 as variable. Evaluating DERIVF( ) formula in cell A2 computes the function derivative at 0.5 as shown in Table 6.

TABLE 6

| | A |
|---|---|
| 1 | =LN(X1)/SQRT(X1) |
| 2 | =DERIVF(A1, X1, 0.5) → 3.808685268 | d) Partial Derivatives

Similar to QUADF( ), DERIVF( ) can be applied recursively in Excel to compute higher order partial derivatives as illustrated by the following example:

$$d = \frac{\partial}{\partial y} \frac{\partial}{\partial x} \cos(xy) \bigg|_{(\pi,\pi)} \cong 9.3394486379$$

The formula to differentiate is defined in A1 using X1, Y1 as variables. The inner partial derivative is defined in A2, and serves as the differentiable formula for the outer partial derivative defined in A3. Evaluating A3 computes the result as shown in Table 7.

TABLE 7

| | A |
|---|---|
| 1 | =COS(X1 * Y1) |
| 2 | =DERIVF(A1, X1, PI( )) |
| 3 | =DERIVF(A2, Y1, PI( )) → 9.3394486379 |

II. Differential-Algebraic Equations Solvers
a) Initial Value Problems

The provided Excel spreadsheet function

IVSOLVE (sys, vars, interval, [options])

computes the response of an initial value ordinary differential-algebraic system represented in the following ordered form:

$$\frac{du_i}{dt} = f_i(t, u, y), \, i = 1, n$$

$$0 = g_j(t, u, y), \, j = 1, m$$

with initial conditions $u_i(0)=a_i$, $y_j(0)=b_j$, and over the time Interval t∈[0 T]. The parameters for IVSOLVE( ) are described below:
1. sys: ordered list of (n+m) cells for the system formulas $f_i$ and $g_j$.
2. vars: a list of (1+n+m) cells for the system variables {t, u, y}. The cells for u=[$u_1$, $u_2$, . . . , $u_n$] and y=[$y_1$, $y_2$, . . . , $y_m$] must define the initial conditions for the variables.
3. interval: the time interval limits, and control of output time reporting as described in Table 8.
4. m: the number of algebraic equations in the system. Default is zero.
5. [options]: a list of optional parameters for custom control. They include supplying an analytic system Jacobian matrix, algorithm selection, tolerances values, and custom algorithm settings.

TABLE 8

| Format | Output |
|---|---|
| {t_initial, t_final} | Output divided uniformly in allocated range |
| {t_initial, t_final, ndiv} | Output divided uniformly into ndiv intervals |
| {t0, t1, . . . , t_final} | Output reported at custom points |

Based on the flowchart of FIG. 7, IVSOLVE( ) uses Modules-D & E for evaluation of the system formulas as requested by the underlining solver algorithm. Its solver is based on RADAU5 described by Hairer and Wanner in the book: "Solving Ordinary Differential Equations II: Stiff and Differential-Algebraic Problems", Springer Series in Computational Mathematics, 1996. IVSOLVE( ) is executed as an array formula in an allocated range in Excel. It evaluates to an ordered tabular array or results with a layout described in FIG. 8A. In the results table, values of the system variables are reported at uniform or custom values of the time variable and arranged in a column format. Control for the time variable output is enabled in the third parameter as shown in Table 8.

The use of IVSOLVE( ) in Excel is illustrated by computing the response of the following initial value differential-algebraic system:

$$\frac{du_1}{dt} = -0.04u_1 + 10^4 u_2 y_1$$

$$\frac{du_2}{dt} = 0.04u_1 - 10^4 u_2 y_1 - 3*10^7 u_2^2$$

$$0 = u_1 + u_2 + y_1 - 1$$

with initial Conditions $u_1(0)=1$, $u_2(0)=0$, and $y_1(0)=0$ over the interval $t \in [0\ 1000]$.

Using cells T1, U1, U2, and U3 to represent system variables t, $u_1$, $u_2$, $y_1$ respectively, the system formulas are defined in cells A1:A3, and initial conditions in cells U1:U3 as shown in Table 9.

TABLE 9

| | A | U |
|---|---|---|
| 1 | =−0.04 * U1 + 10000 * U2 * U3 | 1 |
| 2 | =0.04 * U1 − 10000 * U2 * U3 − 30000000 * U2^2 | 0 |
| 3 | =U1 + U2 + U3 − 1 | 0 |

Figure 9A:
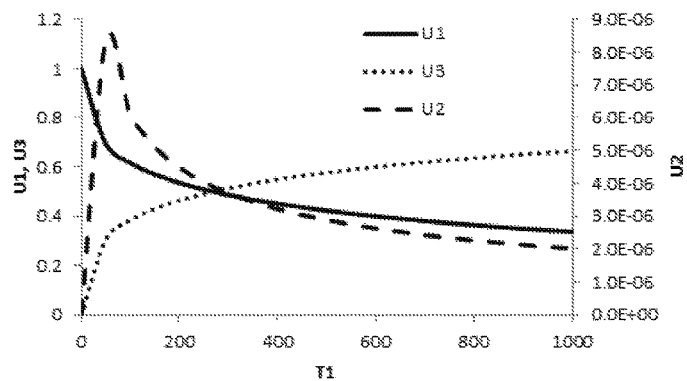
FIGS. 9A to 9C show plots of results obtained by spreadsheet functions utilizing Modules-D & E to solve examples of ordinary and partial differential systems of equations.

Next, the array formula '=IVSOLVE (A1:A3, (T1,U1:U3), {0,1000}, 1)' is evaluated in allocated Excel range B1:E22. It populates the range by the result shown in Table 10. FIG. 9A shows a plot for the computed response using Excel charts.

TABLE 10

| | B | C | D | E |
|---|---|---|---|---|
| 1 | T1 | U1 | U2 | U3 |
| 2 | 0 | 1 | 0 | 0 |
| 3 | 50 | 0.69288 | 8.34415E−06 | 0.307111 |
| 4 | 100 | 0.617245 | 6.15388E−06 | 0.382748 |
| 5 | 150 | 0.570229 | 5.12407E−06 | 0.429765 |
| 6 | 200 | 0.535843 | 4.48766E−06 | 0.464152 |
| 7 | 250 | 0.508693 | 4.04187E−06 | 0.491303 |
| 8 | 300 | 0.48625 | 3.70564E−06 | 0.513746 |
| 9 | 350 | 0.467146 | 3.44016E−06 | 0.532851 |
| 10 | 400 | 0.450524 | 3.22292E−06 | 0.549472 |
| 11 | 450 | 0.435837 | 3.04101E−06 | 0.56416 |
| 12 | 500 | 0.422673 | 2.88523E−06 | 0.577324 |
| 13 | 550 | 0.41078 | 2.75007E−06 | 0.589217 |
| 14 | 600 | 0.399933 | 2.63133E−06 | 0.600064 |
| 15 | 650 | 0.38996 | 2.52558E−06 | 0.610037 |
| 16 | 700 | 0.380753 | 2.43082E−06 | 0.619245 |
| 17 | 750 | 0.372209 | 2.34522E−06 | 0.627789 |
| 18 | 800 | 0.364236 | 2.2674E−06 | 0.635761 |
| 19 | 850 | 0.356763 | 2.19606E−06 | 0.643235 |
| 20 | 900 | 0.349743 | 2.13047E−06 | 0.650255 |
| 22 | 950 | 0.343131 | 2.06992E−06 | 0.656867 |
| 22 | 1000 | 0.336882 | 2.01377E−06 | 0.663116 | b) Boundary Value Problems

The Provided Excel Spreadsheet Function

=BVSOLVE (sys, vars, pts, bcs, domain, m, [options])

computes the response of a multipoint boundary value ordinary differential-algebraic system represented in the following ordered form:

$$\frac{du_i}{dx} = f_i(x, u, y), i = 1, n$$

$$0 = g_j(x, u, y), j = 1, m$$

with boundary conditions $0 = bc_i(u, x)$ at $x = p_i$ in the domain $x \in [0\ L]$. The parameters for BVSOLVE( ) are described below:

1. sys: ordered list of (n+m) cells for the system formulas $f_i$ and $g_j$.
2. vars: a list of (1+n+m) cells for the system variables {x, u, y}. The cells for $u = [u_1, u_2, \ldots, u_n]$ and $y = [y_1, y_2, \ldots, y_m]$ may define optional initial guess formulas for the variables.
3. pts: locations of (n) boundary conditions points.
4. bcs: a list of (n) cells for the corresponding boundary conditions formulas.
5. domain: the spatial interval limits, and control of output spatial points similar to the format shown in Table 8.
6. m: the number of algebraic equations in the system. Default is zero.
7. [options]: a list of optional parameters for custom control. They include supplying an analytic system and boundary conditions Jacobian matrices, algorithm selection, tolerances values, and custom algorithm settings.

Figures 8A, 8B:
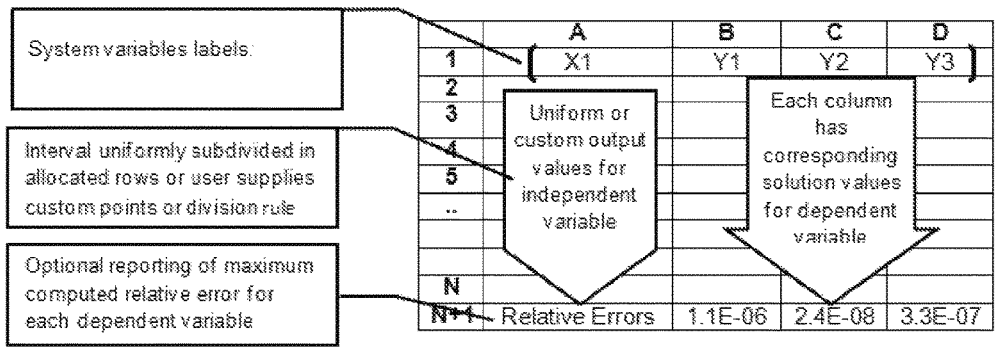
FIG. 8A shows the results layout format produced by a spreadsheet function utilizing Modules-D & E to compute the response of an ordinary differential system of equations.
FIG. 8B shows the results layout format produced by a spreadsheet function utilizing Modules-D & E to compute the response of a partial differential system of equations.

BVSOLVE( ) is similar to IVSOLVE( ) and evaluates to an identical results layout as shown in FIG. 8A, except that it solves a boundary value problem based on the collocation algorithm described by Ascher and Spiteri in the paper: "Collocation software for boundary value differential-algebraic equations, SIAM Journal on Scientific Computing", 1994 15, 938-952. The use of BVSOLVE( ) in Excel is illustrated by computing the response of the following boundary value problem:

$$\frac{du_1}{dx} = u_2$$

$$\frac{du_2}{dx} = 20\left(-e^{u_1} u_2 + \frac{1}{2}\pi \sin\left(\frac{1}{2}\pi x\right) e^{2u_1}\right)$$

with boundary conditions: $u_1(0)=0$, $u_1(1)=0$ in the domain $x \in [0\ 1]$

Using cells X1, U1, U2 for system variables x, $u_1$, $u_2$ respectively, the system formulas are defined in cells A1:A3, the boundary conditions points in B1:132, and the corresponding boundary conditions formulas in cells C1:C2 as shown in Table 11.

TABLE 11

| | A | B | C |
|---|---|---|---|
| 1 | = U2 | 0 | = U1 |
| 2 | = 20 * (−EXP(U1) * U2 + 0.5 * PI( ) * SIN(0.5 * PI( ) * X1) * EXP(2 * U1)) | 1 | = U1 |

Figure 9B:
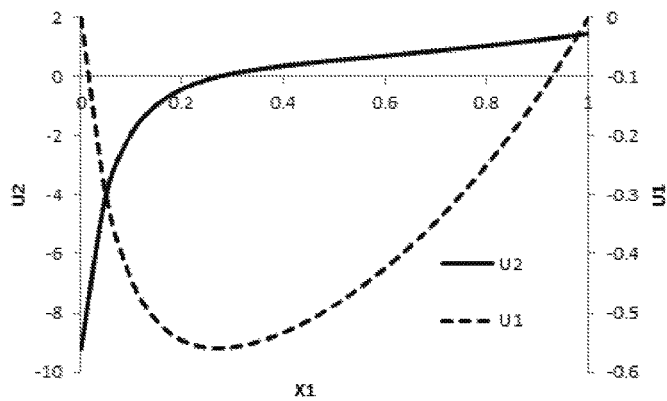

Next, the array formula '=BVSOLVE (A1:A2, (X1,U1:U2), B1:62, C1:C2, {0,1})' is evaluated in allocated Excel range G1:I23. It populates the range with the result shown in Table 12. FIG. 9B shows a plot of the data using Excel charts.

TABLE 12

|    | G          | H            | I          |
|----|------------|--------------|------------|
| 1  | X1         | U1           | U2         |
| 2  | 0          | 0            | −9.22395   |
| 3  | 0.05       | −0.3043492   | −3.93625   |
| 4  | 0.1        | −0.44424441  | −1.92551   |
| 5  | 0.15       | −0.51353621  | −0.95066   |
| 6  | 0.2        | −0.54647914  | −0.41601   |
| 7  | 0.25       | −0.55866051  | −0.09636   |
| 8  | 0.3        | −0.55796756  | 0.110589   |
| 9  | 0.35       | −0.5486075   | 0.256436   |
| 10 | 0.4        | −0.53287428  | 0.368873   |
| 11 | 0.45       | −0.51201677  | 0.463304   |
| 12 | 0.5        | −0.48669581  | 0.548502   |
| 13 | 0.55       | −0.45723449  | 0.629561   |
| 14 | 0.6        | −0.42375759  | 0.709506   |
| 15 | 0.65       | −0.38627075  | 0.790212   |
| 16 | 0.7        | −0.34470297  | 0.872914   |
| 17 | 0.75       | −0.29893093  | 0.958517   |
| 18 | 0.8        | −0.24879048  | 1.047768   |
| 19 | 0.85       | −0.19408162  | 1.14137    |
| 20 | 0.9        | −0.13456902  | 1.240042   |
| 21 | 0.95       | −0.06997994  | 1.344568   |
| 22 | 1          | −1.9429E−16  | 1.455833   |
| 23 | Rel. Errors| 1.87103E−06  | 8.35E−05   | c) Partial Differential Problems

The provided Excel spreadsheet function

PDSOLVE (sys, vars, lbcs, rbcs, domain, interval, [options])

Computes the response of an initial boundary-value differential-algebraic system represented in the following ordered form:

$$\frac{\partial u_i}{\partial t} = f_i(t, x, u, u_x, u_{xx}), \quad i = 1, n$$

with initial conditions $u_i(t, x)=0$ at $t=0$, and boundary conditions $bc_i(x, u, u_x)=0$ at $x=0$ and $L$, in the time interval: $t \in [0\ T]$ and spatial domain: $x \in [0\ L]$. The parameters for PDSOLVE( ) are described below:

1. sys: ordered list of (n) cells for the system formulas
2. vars: a list of (2+3n) cells for the system variables $\{t, x, u, u_x, u_{xx}\}$. The cells for $u=[u_1, u_2, \ldots, u_n]$ must contain initial condition values for the variables, which can be constants of formulas of x.
3. lbcs: ordered list of (n) cells for the left boundary condition formulas for each system equation. If no boundary condition is needed for an equation, the cell should have the value 'NA'.
4. rbcs: ordered list of (n) cells for the right boundary condition formulas for each system equation. If no boundary condition is needed for an equation, the cell should have the value 'NA'.
5. domain: the spatial interval limits, and control of output spatial points similar to format shown in Table 8.
6. interval: the time interval limits, and control of output time points similar to format shown in Table 8.
7. [options]: a list of optional parameters for custom control. They include supplying an analytic system and boundary conditions Jacobian matrices, algorithm selection, tolerances values, and custom algorithm settings.

Based on the flowchart of FIG. 7, PDSOLVE( ) uses Modules-D & E to evaluate the system formulas for the underlining solver algorithm, which is based on the numerical method of lines described by Schiesser in the book: "The Numerical Method of Lines", San Diego, Calif.: Academic Press, 1991. PDSOLVE( ) generates tabular results in one of two layout formats for the computed response, which contain two independent variables for time and space: a transient format which provides a quick view on the transient behavior of system variables at fixed spatial points; or a snapshot format which provides a snapshot view of system variables distribution at fixed time values. The transient format is demonstrated in FIG. 8B, where the system variables are reported in repeated column blocks for each pair of the output time and space values. The snapshot view layout is identical except that the roles of time and space are interchanged.

The use of PDSOLVE( ) is illustrated in Excel by computing the response of the following partial differential system:

$$\frac{\partial u}{\partial t} = k \frac{\partial^2 u}{\partial x^2}$$

with initial condition $u(x, t)=0$ at $t=0$, left boundary condition $u(x, t)=100$ at $x=0$, and right boundary condition $\partial u(x, t)/\partial x = 0.25(t-20)$ at $x=1$. The problem's spatial domain is $x \in [0\ 1]$ and the time interval is $t \in [0\ 1]$.

Using cells T1, X1, U1, U2, and U3 for system variables $t, x, u, u_x, u_{xx}$ respectively, the system formula is defined in A1, the left boundary condition in B1, and the right boundary condition in C1. A value of zero is specified for the initial condition in U1, as shown in Table 13.

TABLE 13

|   | A       | B           | C                      | K | U |
|---|---------|-------------|------------------------|---|---|
| 1 | = K1 * U3 | = U1 − 100 | = U2 − 0.25 * (T1 − 20) | 1 | 0 |

Figure 9C:
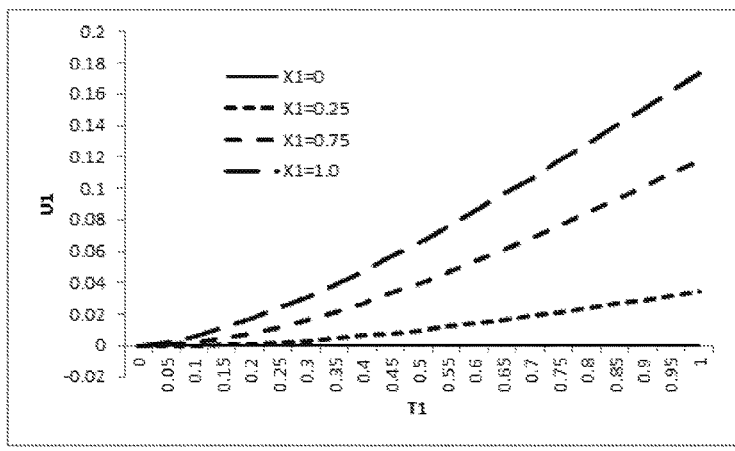

Next, the array formula '=PDSOLVE (A1, (T1, X1, U1:U3), B1, C1, {0, 0.25, 0.75, 1}, {0, 1})' is evaluated in the allocated Excel range G1:K23. It populates the range shown in Table 14 based on the default transient format. FIG. 9C plots the system transient response at the reported spatial points using Excel charts.

TABLE 14

|    | G    | H  | I          | J          | K        |
|----|------|----|------------|------------|----------|
| 1  | X1   | 0  | 0.25       | 0.75       | 1        |
| 2  | T1   | U1 | U1         | U1         | U1       |
| 3  | 0    | 0  | 0          | 0          | 0        |
| 4  | 0.05 | 0  | 1.0476E−05 | 0.0004256  | 0.002116 |
| 5  | 0.1  | 0  | 0.00012165 | 0.0019145  | 0.005946 |
| 6  | 0.15 | 0  | 0.00046505 | 0.0043541  | 0.010893 |
| 7  | 0.2  | 0  | 0.00108083 | 0.0076181  | 0.016767 |
| 8  | 0.25 | 0  | 0.00197256 | 0.0116005  | 0.02343  |
| 9  | 0.3  | 0  | 0.00312257 | 0.0162240  | 0.030791 |
| 10 | 0.35 | 0  | 0.00450849 | 0.0214111  | 0.03876  |
| 11 | 0.4  | 0  | 0.00610069 | 0.0270906  | 0.047261 |
| 12 | 0.45 | 0  | 0.00787356 | 0.0331967  | 0.056222 |
| 13 | 0.5  | 0  | 0.00980256 | 0.03967770 | 0.065588 |
| 14 | 0.55 | 0  | 0.01186897 | 0.04649278 | 0.075317 |
| 15 | 0.6  | 0  | 0.01405750 | 0.05360453 | 0.085366 |
| 16 | 0.65 | 0  | 0.01635493 | 0.06098080 | 0.095703 |
| 17 | 0.7  | 0  | 0.01875013 | 0.06859335 | 0.106295 |
| 18 | 0.75 | 0  | 0.02122756 | 0.07640578 | 0.117104 |
| 19 | 0.8  | 0  | 0.02378355 | 0.08440760 | 0.128118 |
| 20 | 0.85 | 0  | 0.02640404 | 0.09256512 | 0.1393   |
| 21 | 0.9  | 0  | 0.02908266 | 0.10086286 | 0.150634 |
| 22 | 0.95 | 0  | 0.03181410 | 0.10928799 | 0.162106 |
| 23 | 1    | 0  | 0.03458887 | 0.11781739 | 0.173691 |

III. Algebraic Equations and Inequalities Solver

The provided Excel spreadsheet function

NLSOLVE (constraints, variables, nge, [options])

computes an optimal solution to a system of k equations and m−k inequalities, with variables x=[$x_1, x_2, \ldots, x_n$], ordered in the following form:

$$f_i(x) = 0, \quad i = 1, k$$

$$f_i(x) \geq 0, \quad i = k+1, m$$

The parameters for NLSOLVE( ) are described below:
1. constraints: (m) references to the formulas for the LHS formulas $f_i$.
2. variables: (n) references to the variable cells. A guess value must be defined for each variable.
3. nge: the number of inequalities in the system (m−k). Default is zero.
4. [options]: a list of optional parameters for custom control. They include supplying an analytic constraints Jacobian matrix, algorithm selection, tolerances values, and custom algorithm settings.

Based on the flowchart of FIG. 7, NLSOLVE( ) uses Modules-D & E, and the Levenberg-Marquardt minimization procedure described in the book "Numerical Recipes in C: The Art of Scientific Computing", Cambridge University Press, 1992. The Levenberg-Marquardt algorithm finds the optimal solution to a system of equations and inequalities by minimizing an implicit objective function, which is defined as the sum of squares of the equations and active inequalities.

NLSOLVE( ) usage in Excel is illustrated by solving the following system of algebraic equations, which has one solution at (1, 10, 1, 5, 4, 3):

$$x_3 e^{-0.1 x_1} - x_4 e^{-0.1 x_2} + x_6 e^{-0.1 x_5} - e^{-0.1} + 5 e^{-1} - 3 e^{-0.4} = 0$$

$$x_3 e^{-0.2 x_1} - x_4 e^{-0.2 x_2} + x_6 e^{-0.2 x_5} - e^{-0.2} + 5 e^{-2} - 3 e^{-0.8} = 0$$

$$x_3 e^{-0.3 x_1} - x_4 e^{-0.3 x_2} + x_6 e^{-0.3 x_5} - e^{-0.3} + 5 e^{-3} - 3 e^{-1.2} = 0$$

$$x_3 e^{-0.4 x_1} - x_4 e^{-0.4 x_2} + x_6 e^{-0.4 x_5} - e^{-0.4} + 5 e^{-4} - 3 e^{-1.6} = 0$$

$$x_3 e^{-0.5 x_1} - x_4 e^{-0.5 x_2} + x_6 e^{-0.5 x_5} - e^{-0.5} + 5 e^{-5} - 3 e^{-2} = 0$$

$$x_3 e^{-0.6 x_1} - x_4 e^{-0.6 x_2} + x_6 e^{-0.6 x_5} - e^{-0.6} + 5 e^{-6} - 3 e^{-2.4} = 0$$

Using cells X1:X6 for the system variables with a guess value of 1, the system equations are defined in cells A1:A6 as shown in Table 15.

TABLE 15

| | A | X |
|---|---|---|
| 1 | = X3 * EXP(−0.1 * X1) − X4 * EXP(−0.1 * X2) + X6 * 1 EXP(−0.1 * X5) − EXP(−0.1) + 5 * EXP(−1) − 3 * EXP(−0.4) | |
| 2 | = X3 * EXP(−0.2 * X1) − X4 * EXP(−0.2 * X2) + X6 * 1 EXP(−0.2 * X5) − EXP(−0.2) + 5 * EXP(−2) − 3 * EXP(−0.8) | |
| 3 | = X3 * EXP(−0.3 * X1) − X4 * EXP(−0.3 * X2) + X6 * 1 EXP(−0.3 * X5) − EXP(−0.3) + 5 * EXP(−3) − 3 * EXP(−1.2) | |
| 4 | = X3 * EXP(−0.4 * X1) − X4 * EXP(−0.4 * X2) + X6 * 1 EXP(−0.4 * X5) − EXP(−0.4) + 5 * EXP (−4) − 3 * EXP(−1.6) | |
| 5 | = X3 * EXP(−0.5 * X1) − X4 * EXP(−0.5 * X2) + X6 * 1 EXP(−0.5 * X5) − EXP(−0.5) + 5 * EXP (−5) − 3 * EXP(−2) | |
| 6 | = X3 * EXP(−0.6 * X1) − X4 * EXP(−0.6 * X2) + X6 * 1 EXP(−0.6 * X5) − EXP(−0.6) + 5 * EXP (−6) − 3 * EXP(−2.4) | |

TABLE 15-continued

Evaluating the formula '=NLSOLVE (A1:A6, X1:X6)' in allocated range B1:C6 populates the range with the results shown in Table 16.

TABLE 16

| | B | C |
|---|---|---|
| 1 | X1 = | 1 |
| 2 | X2 = | 10 |
| 3 | X3 = | 1 |
| 4 | X4 = | 5 |
| 5 | X5 = | 4 |
| 6 | X6 = | 3 |

Functional Formulation for Optimization Problems

The unique spreadsheet functions introduced thus far form essential building blocks which enable the construction of a functional formulation for carrying out a constrained optimization of a parameterized system of differential equations in a spreadsheet application. In the following, I present a functional formulation that provides the framework for carrying out the optimization process in the spreadsheet application on a computer. In what follows, a bold symbol indicates a vector value. Let u(x, $p_d$) be the response function to a system of differential equations, where x is an independent variable and $p_d$ is a set of design parameters (here x may represent a temporal or spatial variable). u(x, $p_d$) may represent the response of a system of ordinary differential equations with one independent variable x, or to a system of partial differential equations with two independent variables t and x, by defining u(x, $p_d$)≡u($\bar{t}$, x, $p_d$), or alternatively u(t, $p_d$)≡u(t, $\bar{x}$, $p_d$), where $\bar{t}$ or $\bar{x}$ is a specified fixed value for the corresponding independent variable.

The reader can think of u(x, $p_d$) as an abstract to the tabular results obtained by any of the spreadsheet functions IVSOLVE( ), BVSOLVE( ), or PDSOLVE( ). In a functional formulation, a pure function is equivalent to and exchangeable by its value. Accordingly, u(x, $p_d$) can be interpreted as providing values for the differential system variables u=[$u_1, u_2, \ldots, u_n$] at a specified value for x, and for a given configuration of the system design parameters $p_d$.

Let $f_i$(u(x, $p_d$),[x], $p_d$) be a criterion function that computes a scalar property from the differential system response u(x, $p_d$), for a specified range of the independent variable [x], and values for the design parameters $p_d$. For example, $f_i$ may simply extract a single value from u(x, $p_d$), or may compute a complex value by applying a prescribed operation, such as integrating a component of u(x, $p_d$) over a specified range [x]. Given a target design value $\tau_i$ for each criterion function $f_i$, we construct the following system of m constraints:

$$g_i(p_d) = 0 \quad i = 1, k$$

$$g_j(p_d) \geq 0 \quad j = k+1, m$$

where $g_i$ is defined as follows:

$$g_i(p_d) \equiv f_i(u(x, p_d), [x], p_d) - \tau_i \quad i = 1, m$$

Let $$\delta_j(p_d) = \begin{cases} 0, & g_j(p_d) \geq 0 \text{ is true} \\ 1, & \text{else} \end{cases} \quad j = k+1, m$$

The constrained optimization problem can be stated as follows:

$$\text{Minimize } C(p_d) = \sum_{i=1}^{k} g_i(p_d)^2 + \sum_{j=k+1}^{m} [g_j(p_d)\delta_j(p_d)]^2$$

In a functional form the minimization of the objective $C(p_d)$ is expressed as the evaluation of a functional of the form:

$$\text{solve}(g(p_d), p_d, m-k)$$

which maps directly to the spreadsheet function NLSOLVE( ) introduced earlier. NLSOLVE( ) uses Levenberg-Marquardt to find the solution to a system of equations and inequalities by a minimizing an implicit objective function equivalent to $C(p_d)$ which represents the sum of the squares of the constraints values.

The presented functional formulation lays the foundation for a three-step optimization process enabled by the unique spreadsheet functions that form the pillars of the functional formulation. The Excel spreadsheet application provides the platform to execute the process on a computer, and the necessary mechanisms to embody the functions. The three steps of the process are:
I. Obtain the response to the parameterized differential system by a suitable spreadsheet function: IVSOLVE( ), BVSOLVE( ), or PDSOLVE( ).
II. Define constraints on the system response by the aid of criterion functions.
III. Solve the system of constraints for the design parameters using the spreadsheet function NLSOLVE( ).

Clearly, enabling the three step optimization process is contingent on the development of criterion spreadsheet functions which enable the construction of constraints and provide the link between the differential system and the optimizer. Accordingly, a set of criterion spreadsheet functions are developed and described next.

Criterion Worksheet Functions

A criterion function corresponds to $f_i(u(x, p_d), [x], p_d)$ and enables the definition of constraints for the optimization process. It computes a scalar property from the tabular results array of a differential systems solver, for the purpose of providing a handle on the system response. A constraint formula then calculates the difference between the scalar property and a target design value. One or multiple constraint formulas are defined, which are then solved for the optimal parameter values using NLSOLVE( ) Three spreadsheet criterion functions ARRAYVAL( ), ODEVAL( ), and PDEVAL( ) are developed for this purpose and described below.

A) Criterion Function: ARRAYVAL( )
The provided Excel spreadsheet function
ARRAYVAL (data, global_oper, local_oper)
enables the computation of an arbitrary value from a results array by applying global and local operations to selected data within the array. The parameters for ARRAYVAL( ) are described below:
1. data: a cell or a range of cells selected form the results array of a differential system solver.
2. global_oper: a reference to a formula to apply to the selected data. The formula must reference the selected data as VAR1 and evaluate to a scalar value. For example, to compute the maximum of data, the formula is defined as '=MAX(VAR1)'. As a convenience, typical global operations such as computing maximum, minimum or mean can be specified by the string "MAX", "MIN", or "MEAN" without the need to define a formula.
3. local_oper: an optional reference to a formula that is applied to each element of data prior to applying the global operation formula. The formula must reference elements in data as VAR1. For example, to apply absolute operator for each element of data, the formula is defined as '=ABS(VAR1)'.

ARRAYVAL( ) uses Modules D & E to evaluate the supplied local and global formulas for the selected data within the results array.

B) Criterion Function: ODEVAL( )
The provided Excel spreadsheet function
ODEVAL (range, operand, operation, opr_param)
applies a calculus integration, differentiation, or interpolation operation to compute a value from the results array of IVSOLVE( ) or BVSOLVE( ). The operand for the calculus operation is specified as a formula of one or more system variable. The operation is applied over a selected range for the system's independent variable by the aid of a cubic spline curve fit to the data. The parameters for ODEVAL( ) are described below:
1. range: a range of cells selected from the first column of the tabular results array (see FIG. 8A) which sets the independent temporal or spatial variable domain for the calculus operation.
2. operand: a reference to a formula that defines the operand for the calculus operation. The formula references one or more system's variables. As a convenience, if the operand is a single system's variable, then the reference to that system's variable can be specified without the need for a formula.
3. operation: a string identifier for the calculus operation to be performed. The string can be selected from the list below:
a. "INTEL" to integrate the operand over the selected range.
b. "DERIV" to differentiate the operand at the selected value in opr_param.
c. "INTERP" to interpolate the operand at the selected value in opr_param.
4. opr_param: a value that specifies the differentiation or interpolation point for the calculus operation. Not required for integration operation.

Figure 10:
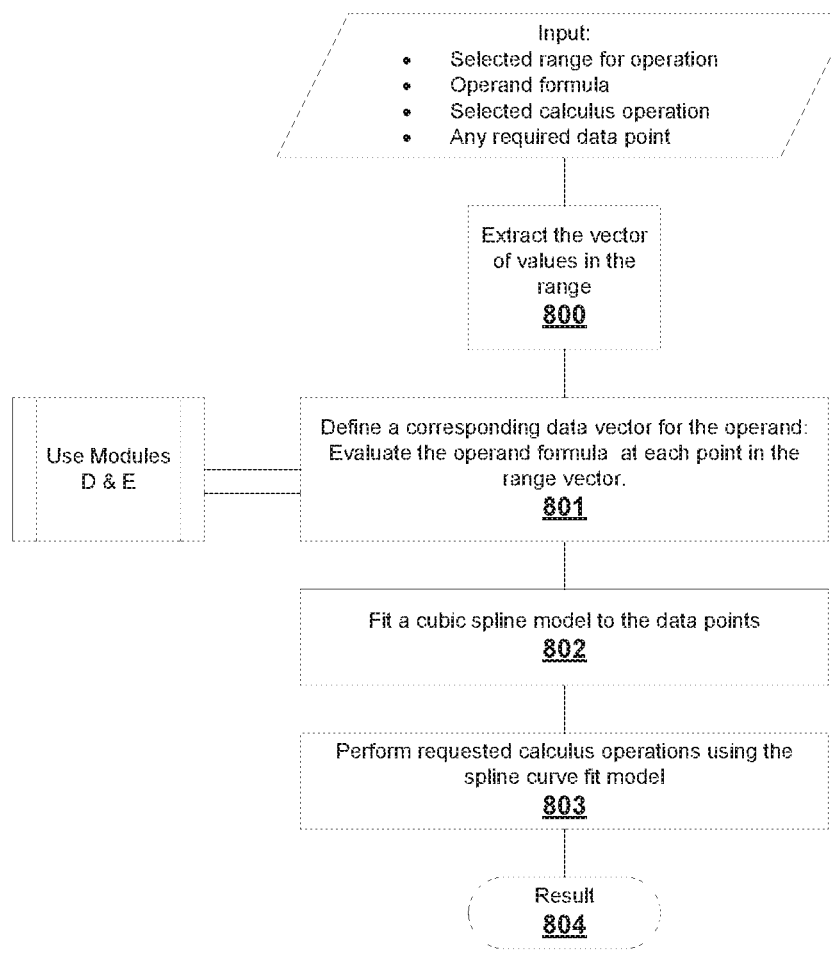
FIG. 10 shows flowchart for the algorithm utilized by criterion spreadsheet functions ODEVAL( ) and PDEVAL( ) described below, which enable definition of constraints on the response of a differential system for a three-step optimization process.

FIG. 10 shows the flowchart for the ODEVAL( ) procedure, which defines two pairs of vectors for the range and corresponding operand values. The range vector is readily obtained from the first parameter 800. The operand data vector is obtained using Modules D & E to evaluate the supplied operand formula for each point in the range vector 801. The data points are then fit to a curve using a standard cubic spline fit technique 802. Alternative curve fitting models can also be used. The advantage of the spline model is that it allows for a direct calculation of the curve integral value, derivative, or interpolated value at any point along the curve, using standard procedures, as described by Gao, Zhang and Cao in the article: "Differentiation and numerical Integral of the Cubic Spline Interpolation", in the Journal of Computers, Vol. 6, No 10, 2011. The requested operation is performed on the cubic spline curve fit 803, and the computed value is returned 804 to the requester.

C) Criterion Function: PDEVAL( )

The provided Excel spreadsheet function

PDEVAL (range, operand, block, operation, opr_param) serves an identical role to that of ODEVAL( ), except that it applies to the results array obtained by PDSOLVE( ) for a partial differential system. The additional block parameter selects the system's variables block in the tabular result array of PDSOLVE( ). The block value is specified by the value of the second system's independent variable for the block in the first row of the results table (see FIG. 8B).

Three-Step Optimization Process for Parameterized Differential Systems

The presented spreadsheet functions calculate static results when evaluated manually for their input. On the other hand, they are evaluated dynamically when executed within a functional program representing the three-step optimization process. The criterion functions provide the links that connect the differential systems solvers IVSOLVE( ), BSOLVE( ), and PDSOLVE( ) with the constraints solver NLSOLVE( ), and enable the operation of the functional formulation of the spreadsheet functions. The links are achieved naturally, thanks to the design of the formula evaluation graph produced by Module-D, via special handling of criterion functions during the construction of graph nodes of type F. This special handling works as follows: a node of type F that contains a criterion function call is further expanded by inserting a child node of type D that contains the underlining differential system solver call. The formula for the latter is obtained from the first parameter of the criterion function via the Excel API. During the evaluation of the constraints graphs by Module-E as requested by NLSOLVE( ), nodes of type D are evaluated at the current values for the NLSOLVE( ) system variables, which represent values of the design parameters for the underlining differential system. Evaluation of type D nodes is accomplished by a direct call to the differential system solver function using the current values of the parameters. The obtained array result for node D is then processed by the criterion function to compute the requested scalar property, which represents the value for the F node. Module-E then proceeds normally to evaluate remaining graph nodes, and returns the current value of the constraint formula represented on the graph.

In what follows, I present two examples to demonstrate the merits of the three-step optimization process utilizing the developed spreadsheet functions. Please note the simplicity by which optimal results are obtained for what otherwise would require a complex process. These examples are produced using the developed computer program Add-In for Excel.

Example 1: Customizing a $2^{nd}$ Order Dynamical System Response

Consider the $2^{nd}$ order differential equation $$\frac{d^2x}{dt^2} + 2\zeta w_n d\frac{x}{t} + w_n^2 x = 0$$

which describes a dynamical system with inertia, energy storage, and dissipation components. In this formulation, $x(t)$ represents the displacement, $w_n$ represents the natural frequency, and $\zeta$ the damping ratio. The objective is to find optimal values for $w_n$ and $\zeta$ such that the system has an absolute overshoot value of 2.0 at a peak time of 2.0 seconds, in response to an initial displacement condition of one. The overshoot is defined as the maximum absolute peak value of the displacement curve $x(t)$, and the peak time is the time at which the overshoot is attained.

Step 1:

Solve the differential system with initial values for the design parameters.

In order to use IVSOLVE( ), the $2^{nd}$ order system is represented as two first order differential equations:

$$\frac{dx}{dt} = v$$

$$\frac{dv}{dt} = -2\zeta w_n v - w_n^2 x$$

The problem input definition for IVSOLVE( ) is shown in Table 17. The system formulas are defined in B2:B3 using named variables cells t, x, and v, with shown initial conditions. The formulas reference the design parameters zeta and wn, with shown initial values. Two additional named cells, overshoot and peaktime, are used to hold values for the target design values.

TABLE 17

| | A | B | C | D |
|---|---|---|---|---|
| 1 | | Differential system | Target design values | |
| 2 | dx/dt | = v | overshoot | −2.0 |
| 3 | dv/dt | = −2 * zeta * wn * v − wn/\2 * x | peaktime | 2.0 |
| 4 | | System variables/initial conditions | Design parameters with initial values | |
| 5 | t | 0 | zeta | 0.25 |
| 6 | x | 1 | wn | 1 |
| 7 | v | 0 | | |

Figure 11A:
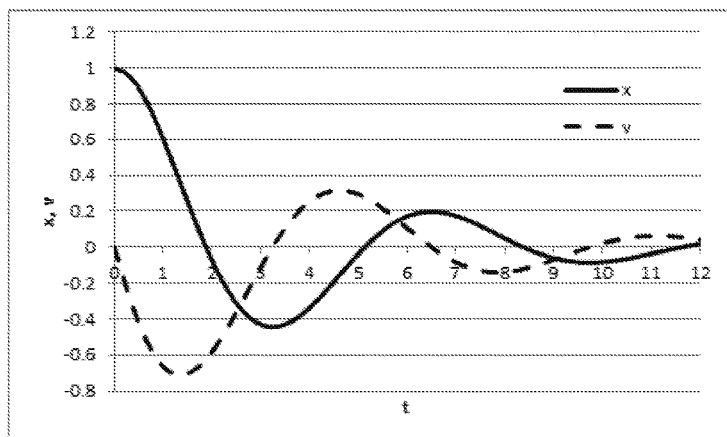
FIGS. 11A and 11B show plots for the initial and optimized responses respectively, of a $2^{nd}$ order dynamical system used in the first example below for illustrating the three-step optimization process.

Table 18 shows the results obtained by evaluating the formula '=IVSOLVE(B2:B3, (t, x, v), {0, 12})' in allocated range I1:K41. The data is plotted in FIG. 11A using Excel charts. The plot shows that the default system response exhibits an absolute overshoot over 0.4 at approximately a peak time of 3.3 when using the initial values of 0.25 and 1 of the design parameters zeta and wn.

TABLE 18

| | I | J | K |
|---|---|---|---|
| 1 | t | x | v |
| 2 | 0 | 1 | 0 |
| 3 | 0.307692 | 0.95535 | −0.28071 |
| 4 | 0.615385 | 0.833891 | −0.49696 |
| 5 | 0.923077 | 0.657155 | −0.6391 |
| 6 | 1.230769 | 0.448401 | −0.70534 |
| 7 | 1.538462 | 0.230376 | −0.70073 |
| 8 | 1.846154 | 0.023398 | −0.63575 |
| 9 | 2.153846 | −0.15612 | −0.5247 |
| 10 | 2.461538 | −0.29644 | −0.3838 |
| 11 | 2.769231 | −0.39094 | −0.22958 |
| 12 | 3.076923 | −0.43793 | −0.07737 |
| 13 | 3.384615 | −0.4401 | 0.05988 |
| 14 | 3.692308 | −0.40364 | 0.172347 |
| 15 | 4 | −0.33723 | 0.253769 |
| 16 | 4.307692 | −0.25094 | 0.301494 |

TABLE 18-continued

|    | I        | J        | K        |
|----|----------|----------|----------|
| 17 | 4.615385 | −0.15511 | 0.316149 |
| 18 | 4.923077 | −0.05944 | 0.301196 |
| 19 | 5.230769 | 0.027772 | 0.26216  |
| 20 | 5.538462 | 0.100128 | 0.205861 |
| 21 | 5.846154 | 0.153446 | 0.139668 |
| 22 | 6.153846 | 0.185801 | 0.070754 |
| 23 | 6.461538 | 0.197366 | 0.005509 |
| 24 | 6.769231 | 0.190099 | −0.05091 |
| 25 | 7.076923 | 0.167319 | −0.09486 |
| 26 | 7.384615 | 0.13322  | −0.12428 |
| 27 | 7.692308 | 0.092385 | −0.13868 |
| 28 | 8        | 0.049327 | −0.13896 |
| 29 | 8.307692 | 0.008121 | −0.1271  |
| 30 | 8.615385 | −0.02792 | −0.10586 |
| 31 | 8.923077 | −0.05639 | −0.07844 |
| 32 | 9.230769 | −0.07589 | −0.0481  |
| 33 | 9.538462 | −0.08601 | −0.01789 |
| 34 | 9.846154 | −0.08719 | 0.009559 |
| 35 | 10.15385 | −0.08061 | 0.032266 |
| 36 | 10.46154 | −0.06796 | 0.048927 |
| 37 | 10.76923 | −0.05119 | 0.05895  |
| 38 | 11.07692 | −0.03235 | 0.062412 |
| 39 | 11.38462 | −0.01339 | 0.059949 |
| 40 | 11.69231 | 0.004037 | 0.052616 |
| 41 | 12       | 0.018627 | 0.041749 |

Step 2:

Define constraints.

To alter the system response so it attains the target overshoot and peak time, two equality constraints are defined using the criterion functions ARRAYVAL( ) and ODEVAL( ) as shown in Table 19. Noting (see FIG. 11A) that the displacement curve is negative when the peak is attained, constraint C1 requires that the minimum value of the displacement, (column J2:J41 of Table 18), equals the target overshoot, while constraint C2 requires that the interpolated value for the displacement at the target peak time equals the target overshoot. There are other equally valid constraints that can be used in place of C2 above. For instance, we can require that the derivative of the displacement at the target peak time vanishes by specifying the constraint '=ODEVAL(I2:I41, x, "DERIV", peaktime)', or equivalently the interpolated value of the velocity at the target peak time equals zero by the specifying the constraint '=ODEVAL(I2:I41, v, "INTERP", peaktime)'. Using either of these constraints to replace C2 produces same results.

TABLE 19

|   | C |
|---|---|
| 1 | = ARRAYVAL(J2:J41, "MIN") − overshoot |
| 2 | = ODEVAL(I2:I41, x, "INTERP", peaktime) − overshoot |

Step 3:

Solve the system of constraints for the design parameters.

Figure 11B:
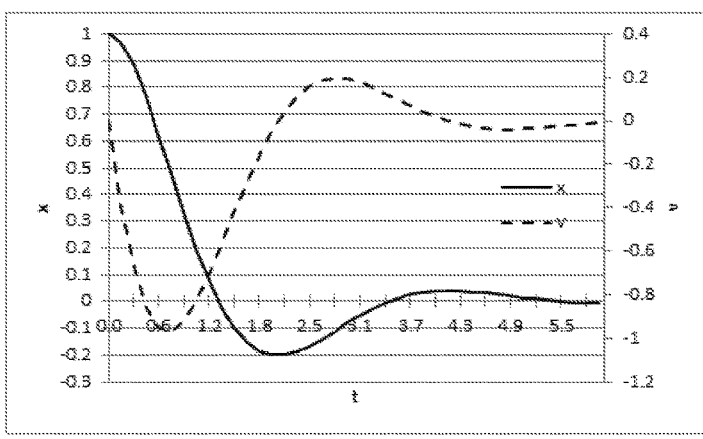

The system of constraints C1:C2 is solved using NLSOLVE( ) with zeta and wn as variables by the formula '=NLSOLVE((C1,C2),(zeta,wn)' in array D1:E3. The results obtained are shown in Table 20. FIG. 11B shows the modified system response, which satisfies the design objectives at the optimal values for zeta and wn.

TABLE 20

|   | D       | E           |
|---|---------|-------------|
| 1 | zeta    | 0.45402108  |
| 2 | wn      | 1.699024479 |
| 3 | SSERROR | 7.47409E−25 |

Example 2: Computing Train Propulsion and Travel Time

A frictionless train uses a constant propulsion force to accelerate, but relies solely on the gravitational pull of the Earth, as well as aerodynamic drag for deceleration. Based on the assumptions of Table 21, we need to compute the required propulsion force and the trip time for the train to travel between two cities 1000 km apart through a straight tunnel.

TABLE 21

| Train mass | m = 100,000 (kg) |
|---|---|
| Distance travelled | d = 1000,000 (m) |
| Earth radius | Re = 6371,000 (m) |
| Gravitational constant | g = 10 m/s$^2$ |
| Propulsion force | $F_p$ = constant (N) Unknown value |
| Drag force | $F_d(v)$ = 0.5 * v$^2$(N) |
| Gravitational force | $F_g(\theta)$ = m * g * cos($\theta$) (N) |

Constrained Optimization Model

Figure 12:
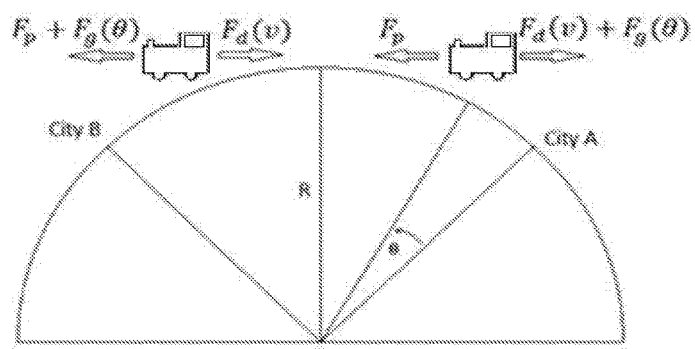
FIG. 12 shows a schematic for the forces acting on a train which is used in the second example below for illustrating the three-step optimization process.

The forces acting on the train during its motion between the two cities are depicted in FIG. 12. Applying Newton's second law, the motion for the train is governed by the 2$^{nd}$ order differential equation:

$$m*\ddot{x} = F_p - F_d(\dot{x}) + F_g(\theta(x))$$

with initial conditions $x(0)=0$, $\dot{x}=0$ at departure City A. Since $d/Re \ll 1$, where d is the distance between the two cities and Re is the radius of the earth, the formula for the angle, $\theta$, spanning the arc travelled by the train as a function of travelled distance x is given by:

$$\theta(x) = \begin{cases} \tan^{-1}\left(\frac{Re}{d/2-x}\right), & x < d/2 \\ \frac{\pi}{2}, & x = d/2 \\ \tan^{-1}\left(\frac{Re}{d/2-x}\right) + \pi, & x > d/2 \end{cases}$$

Upon arrival at city B, the train comes to a halt, so the final conditions can be stated as:

$$x(t_f) = d$$

$$\dot{x}(t_f) = 0$$

The final conditions represent constraints on the differential equation model for the train's motion. The problem then becomes finding optimal values for the unknown propulsion force $F_p$ and the final time $t_f$ such that the two constraints are satisfied. The answer is found easily using the three-step optimization process in Excel spreadsheet, as shown below.

Step 1:

Solve the differential system with initial values for the design parameters.

Table 22 shows the problem input definition for IVSOLVE( ). The $2^{nd}$ order model differential equation is represented as two first order equations in cells B2:B3 using the named cells t, x, and v for the system variables, and the named cells Fp, Fd, Fg, and Th for the force formulas.

TABLE 22

| | A | B | C | D |
|---|---|---|---|---|
| 1 | Differential system | | Forces formulas | |
| 2 | dx/dt | = v | Fd | = 0.5 * v/\2 |
| 3 | dv/dt | = 1/m * (Fp − Fd + Fg) | Fg | = m * g * COS(Th) |
| 4 | System variables with initial conditions | | Th | = IF(x < d/2, ATAN(Re/(d/2 − x)), IF(x > d/2, ATAN(Re/(d/2 − x)) + PI( ), PI( )/2)) |
| 5 | t | 0 | | |
| 6 | x | 0 | Constant parameters | |
| 7 | v | 0 | g | 10 |
| 8 | Design parameters with initial values | | Re | 6371000 |
| 9 | Fp | 1000 | d | 1000000 |
| 10 | Tf | 2000 | m | 100000 |

The system is solved with IVSOLVE( ) for a guess value of 1000 for $F_p$ and for a sufficiently long time of 4500 seconds. Table 23 shows the obtained result by evaluating the formula '=IVSOLVE(B2:B3, (t, x, v), {0, 4500})' in the allocated range J1:L38.

TABLE 23

| | J | K | L |
|---|---|---|---|
| 1 | t | x | v |
| 2 | 0 | 0 | 0 |
| 3 | 125 | 6115.463 | 96.66716 |
| 4 | 250 | 23618.42 | 180.3757 |
| 5 | 375 | 50345.74 | 243.5815 |
| 6 | 500 | 83614.12 | 285.3167 |
| 7 | 625 | 120912.9 | 308.8178 |
| 8 | 750 | 160244.8 | 318.6075 |
| 9 | 875 | 200165.6 | 318.7776 |
| 10 | 1000 | 239672.8 | 312.4788 |
| 11 | 1125 | 278105.9 | 301.8894 |
| 12 | 1250 | 315027.7 | 288.4672 |
| 13 | 1375 | 350145.5 | 273.1784 |
| 14 | 1500 | 383269.8 | 256.6382 |
| 15 | 1625 | 414271.2 | 239.2515 |
| 16 | 1750 | 443058.6 | 221.296 |
| 17 | 1875 | 469577.2 | 202.9315 |
| 18 | 2000 | 493781.3 | 184.2855 |
| 19 | 2125 | 515639.8 | 165.4439 |
| 20 | 2250 | 535135 | 146.4526 |
| 21 | 2375 | 552249.8 | 127.3546 |
| 22 | 2500 | 566971.2 | 108.1826 |
| 23 | 2625 | 579292.2 | 88.95507 |
| 24 | 2750 | 589207.6 | 69.68509 |
| 25 | 2875 | 596712.8 | 50.38592 |
| 26 | 3000 | 601804.6 | 31.06775 |
| 27 | 3125 | 604479.3 | 11.73845 |
| 28 | 3250 | 604737.5 | −7.59494 |
| 29 | 3375 | 602579.9 | −26.9254 |
| 30 | 3500 | 598007 | −46.2459 |
| 31 | 3625 | 591022 | −65.5454 |
| 32 | 3750 | 581623.1 | −84.8236 |
| 33 | 3875 | 569814.6 | −104.068 |
| 34 | 4000 | 555605.2 | −123.257 |
| 35 | 4125 | 539003.6 | −142.369 |
| 36 | 4250 | 520018.9 | −161.382 |
| 37 | 4375 | 498664.1 | −180.264 |
| 38 | 4500 | 474960.7 | −198.957 |

Step 2:

Define constraints.

Using ODEVAL( ), we define in Table 24 two constraints, which correspond to the final conditions on the differential model. Constraint C14 requires that the interpolated value for x at the final but unknown time $t_f$ equal the distance travelled d, while constraint C15 requires that the interpolated value for the velocity v at the final time $t_f$ vanishes.

TABLE 24

| | | C |
|---|---|---|
| 14 | | = ODEVAL(J4:J40, x, "INTERP", Tf) − d |
| 15 | | = ODEVAL(J4:J40, v, "INTERP", Tf) |

Step 3:

Solve the system of constraints for the design parameters.

Using NLSOLVE( ), the system of constraints C14:C14 is solved with $F_p$ and $t_f$ as variables by evaluating formula '=NLSOLVE((C14,C15),(Fp,Tf)' in array A16:618. The computed optimal values for $F_p$ and $t_f$ are shown Table 25.

TABLE 25

| | A | B |
|---|---|---|
| 16 | Fp | 62648.94 |
| 17 | Tf | 3863.575 |
| 18 | SSERROR | 1E−16 |

CONCLUSION, RAMIFICATIONS, AND SCOPE

It is remarkable that the presented spreadsheet functions had no parallels in the history of the spreadsheet application since its inception in 1978. They represent a breakthrough in the utilization of the spreadsheet application for a new class of problems beyond the current scope of prior art. Prior art was confined to the limitations of the spreadsheet's inherent design, which restricts functions to operating on constant inputs only. Prior art utilized the conventional command mechanism, which as pointed out earlier, lacks the properties required to support a functional formulation, and consequently limits the scope of problems it can handle.

The advantages of enabling a spreadsheet function to passively evaluate formulas while retaining its distinguished properties are significant. In particular, they enable computing the response and other properties of any system that can be modelled by formulas in a spreadsheet application by means of a spreadsheet function utilizing an appropriate algorithm. I have provided several spreadsheet functions that enable computing results for the following problem categories:

Integrals and derivatives of formulas of any order.
Systems of differential-algebraic equations.
Systems of algebraic equations and inequalities.

The presented spreadsheet functions offer additional unique merits beyond enabling their integrated solvers. Evident in the illustrated embodiments, these merits include:
Simplified inputs. The input parameters for each spreadsheet function have been reduced to mirror the written model description. Only minimal, high-level description of the system model is required.
Comprehensive control. Provided spreadsheet functions are enabled with optional parameters to provide full control over the underlining solver algorithm. This makes them appealing to the novice and expert alike.

Presentable results. Provided spreadsheet functions produce results in tabular, customizable formats that blend naturally with the spreadsheet, and integrate seamlessly with charting tools, facilitating further data processing.

Transparent. A spreadsheet function encompasses its complete problem definition in an easy to understand format. There is no hidden logic or settings, no additional inputs, no dialogues, and no implicit actions needed to evaluate the function.

Self-documenting. Unlike commands, a spreadsheet function does not mutate or modify its inputs. It generates results in a separate spreadsheet memory assigned to it, which serves to document the model and its results. In contrast, a command overwrites its input memory by the results.

More importantly, the spreadsheet functions support a functional paradigm to carry out an optimization process. As demonstrated by the embodiments, optimizing the response of parameterized system has been reduced to a direct exercise of stating the goals in three logical steps. The reader has seen the simplicity by which definitive results were obtained applying the three-step process to constrained optimization problems of differential systems. A central facilitator of the three-step optimization process is the criterion functions. These functions enable the definition of objective constraints via a simple one-step method that encapsulates complex procedures. In addition to providing the dynamic link between the optimizer and the differential system, the criterion functions offer important advantages by:

Providing direct and simple means to measure a complex characteristic of a system response.

Enabling the statement of an objective constraint as a simple formula that measures the difference between an observed characteristic value and a desired target value.

The aforementioned merits and advantages of the embodiments present a viable commercial opportunity. To realize this opportunity, the unique spreadsheet functions have been incorporated in an Add-In computer program that integrates seamlessly with Excel spreadsheet application, and executes on any computer hardware that supports running Excel application.

It is important to emphasize that the presented spreadsheet functions, and any specificities mentioned in my description are by no means to be construed as limitations on the scope of the embodiments, but rather as exemplification of one or more embodiments. Many other variations are possible including:

Alternative designs for formula representations and evaluation data structures.

Alternative designs for the spreadsheet functions' input parameters and output formats.

Integration of additional algorithms to support more general or specific forms of the differential and algebraic systems.

The incorporation of additional prescribed operations to extend the utility of the criterion functions.

Developing additional spreadsheet functions to support more models that are not illustrated by the embodiments.

Moreover, the preceding description has focused on the Excel spreadsheet application as the preferred platform for the illustrated embodiments. However, Excel should not be construed as the exclusive spreadsheet suitable for the embodiments. Alternative spreadsheet applications, such as Google spreadsheet application, can also be utilized to serve as a platform for the embodiments. Accordingly, the scope should be determined not by the embodiments illustrated, but by the appended claims and their legal equivalents.

The invention claimed is:

1. A method for computing a value of a root formula expression stored in a spreadsheet software application, the method comprising:

A) displaying and operating one or more tabular datasheets by executing the spreadsheet software application on a computer device, each tabular datasheet having a plurality of cells each being designated with a column identifier and a row identifier, the cells being configured to receive values or formula expressions input, evaluate formula expressions, and display output; and B) providing a programming interface to the spreadsheet software application, the programming interface being configured to:

B1) receive the identifiers for at least one of the cells and retrieve a value or a formula expression from the one of the cells;

B2) receive at least an evaluable formula expression, and evaluate its equivalent value, wherein the evaluable formula expression represents an independent textual expression that is evaluated to an equivalent numerical value by said programming interface; and C) providing a graph constructor algorithm for representing the root formula and its interdependence on an additional nested formulas and the variables on a tree-structured graph of relational nodes, the graph constructor algorithm comprising:

C1) receiving the identifiers for the root formula's cell and the variables' cells and communicating with said programming interface to retrieve the root formula expression;

C2) identifying and retrieving the expressions for the additional nested formulas expressions on which the root formula depends by traversing the dependency of any retrieved expression on additional formulas;

C3) constructing a tree-structured graph of relational nodes for representing the interdependence of the root formula expression on the additional nested formulas expressions and the variables;

C4) transforming the tree-structured graph into an evaluation graph of relational nodes containing an equivalent sequence of formula expressions; and D) providing a graph evaluator algorithm for evaluating said evaluation graph, the graph evaluator algorithm comprising:

D1) receiving said evaluation graph and a supply of values for the variables;

D2) traversing the relational nodes of said evaluation graph in an order of their interdependence and transforming the formula expression in each relational node into an evaluable formula expression by replacing the variables in said formula expression in the relational node by the supplied values of the variables, and any reference to a traversed child relational node;

D3) obtaining a value of the relational node by evaluating the value of the evaluable formula expression in the relational node via said programming interface;

D4) aggregating the obtained values of the relational nodes in an order of their interdependence to obtain the value of the root formula expression; and E) providing a computer software application communicable with the spreadsheet software application via said programming interface, the computer software application being configured to execute said graph constructor algorithm followed by said graph evaluator algorithm obtaining the value of the root formula expression in accordance with the supplied values of the one or more variables for the root formula, the root formula depending on the variables explicitly or implicitly through interdependence on the additional nested formulas, not storing or modifying any stored values in the spreadsheet application.

2. The method of claim 1, wherein the spreadsheet software application comprises a native spreadsheet software application.

3. The method of claim 1, wherein the spreadsheet software application comprises a web-based spreadsheet software application.

4. The method of claim 1, further comprising utilizing a solver function of said spreadsheet software application for computing and displaying a numerical solution to an equation system represented by one or more root formulas in a first group of the cells, one or more variables of said root formulas in a second group of the cells, and zero or more parameters of the equation system; and wherein the solver function using the graph evaluator in conjunction with an underlining algorithm for computing the solution to the equation system, and having one or more first input arguments, receives at least the identifiers for the first and second groups of the cells; and wherein evaluating a formula expression of the solver function in a third group of the cells, computes and displays the numerical solution to the equation system in the third group of the cells.

5. The method of claim 4, wherein the solver function is a pure function.

6. The method of claim 4, wherein evaluating the formula expression of the solver function computes and displays the solution value of an integral of said one or more root formulas.

7. The method of claim 4, wherein evaluating the formula expression of the solver function computes and displays the solution value of a multiple integral of said one or more root formulas comprising recursively computing nested integrals of said one or more root formulas.

8. The method of claim 4, wherein evaluating the formula expression of the solver function computes and displays the solution value of a derivative of said one or more root formulas.

9. The method of claim 4, wherein evaluating the formula expression of the solver function computes and displays the solution value of a mixed partial derivative of said one or more root formulas comprising recursively computing nested derivatives of said one or more root formulas.

10. The method of claim 4, wherein the equation system comprises differential equations.

11. The method of claim 4, wherein evaluating the formula expression of the solver function computes and displays the solution to an ordinary differential-algebraic equations system.

12. The method of claim 4, wherein evaluating the formula expression of the solver function computes and displays the solution to an initial value ordinary differential-algebraic equations system comprising receiving initial values from the variables in the second group of the cells.

13. The method of claim 4, wherein evaluating the formula expression of the solver function computes and displays the solution to a boundary value ordinary differential-algebraic equations system comprising: receiving boundary points values and corresponding boundary conditions formulas from an additional group of the cells; and utilizing the graph evaluator to evaluate said boundary conditions formulas in accordance with the underlining algorithm.

14. The method of claim 11, wherein displaying the solution comprises displaying values of the solution in a tabular array of the datasheet;
wherein values of the equations system's independent variable are listed in a first column of the tabular array; and
wherein corresponding values of the equations system's dependent variables are listed in subsequent columns of the tabular array; and
wherein corresponding labels for the equations system's variables are displayed for each of the columns in the first row of the tabular array; and
wherein corresponding error bounds on the computed values for the equations system's dependent variables are listed in the last row of the tabular array.

15. The method of claim 4, wherein evaluating the formula expression of the solver function computes and displays the solution to a partial differential-algebraic equations system.

16. The method of claim 4, wherein evaluating the formula expression of the solver function computes and displays the solution to a partial differential-algebraic equations system comprising: receiving initial values from the variables in the second group of the cells; receiving boundary points values and corresponding boundary condition formulas from an additional group of the cells; and utilizing the graph evaluator to evaluate said boundary conditions formulas in accordance with the underlining algorithm.

17. The method of claim 15, wherein displaying the solution comprises displaying values of the solution in a tabular array of the cells;
wherein values of the equations system's first independent variable are listed in ascending order in a first column of the tabular array;
wherein values of the equations system's second independent variable are listed in blocks of ascending order in a first row of the tabular array; and
wherein values of the equations system's dependent variables are listed in multiple columns, such that values in each dependent variable column correspond to the values of the first independent variable in the first column and the value of the second independent variable in the first row; and
wherein corresponding label for the equations system's second independent variable is displayed in the first row of the tabular array; and
wherein corresponding labels for each of the remaining equations system's variables are displayed in a second row of the tabular array.

18. The method of claim 4, wherein evaluating the formula expression of the solver function computes and displays the solution to a system of algebraic equations and zero, or more inequalities.

19. The method of claim 4, wherein the solver function receives additional optional arguments for controlling the underlining algorithm and the displaying of the solution.

20. The method of claim 4, wherein the solver function receives from an additional group of the cells, formulas representing analytical Jacobian of said one or more root formulas with respect to the variables.

21. The method of claim 1, further comprising utilizing a first and second solver functions of said spreadsheet software application for computing an optimized solution to a parameterized equation system which satisfies one or more constraints, wherein the parameterized equation system is represented by one or more root formulas in a first group of the cells, variables for said root formulas in a second group of the cells, and design parameters for the parameterized equation system in a third group of the cells, said design parameters having initial values in the third group of the cells; and wherein the first solver function, using the graph evaluator in conjunction with a first underlining algorithm, and having one or more first input arguments, receives at least the identifiers for the first and second groups of the cells; and wherein evaluating a first formula expression of the first solver function in a fourth group of the cells computes and displays, in the fourth group of the cells, an initial solution to the parameterized equation system in accordance with the initial values of said design parameters; and wherein the second solver function, using the graph evaluator in conjunction with a second underlining algorithm, and having one or more first input arguments, receives at least the identifiers for the third group of the cells, and the identifiers for a fifth group of the cells containing one or more constraint formulas representing the constraints for the parameterized equation system, said one or more constraint formulas referencing the initial solution in the fourth group of the cells; and wherein evaluating a second formula expression of the second solver function, in a sixth group of the cells, computes and displays, in the sixth group of the cells, optimal values of said design parameters, yielding the optimized solution.

22. A computer apparatus configured to perform all steps of the method of claim 1.

* * * * *